United States Patent [19]
Brandt et al.

[11] Patent Number: 6,085,246
[45] Date of Patent: Jul. 4, 2000

[54] MULTIPLE INTERFACE DATA COMMUNICATION SYSTEM AND METHOD UTILIZING MULTIPLE CONNECTION LIBRARY INTERFACES WITH BUFFER AND LOCK POOL SHARING

[75] Inventors: Mark Steven Brandt, Laguna Beach; Vinh Ha Le, Lake Forest; Jeffrey John Wilson, Mission Viejo, all of Calif.

[73] Assignee: Unisys Corporation, Blue Bell, Pa.

[21] Appl. No.: 09/060,648

[22] Filed: Apr. 15, 1998

[51] Int. Cl.[7] ..................................................... G06F 15/16
[52] U.S. Cl. ........................... 709/227; 709/228; 709/203
[58] Field of Search ..................................... 709/227, 208, 709/250, 203, 229

[56] References Cited

U.S. PATENT DOCUMENTS

| | | | |
|---|---|---|---|
| 4,791,566 | 12/1988 | Sudama et al. | 709/227 |
| 5,165,020 | 11/1992 | Sudama et al. | 709/227 |
| 5,283,871 | 2/1994 | Kobayashi | 709/227 |
| 5,341,477 | 8/1994 | Pitkin et al. | 709/227 |
| 5,617,540 | 4/1997 | Civanlar et al. | 709/227 |
| 5,621,734 | 4/1997 | Mann et al. | 709/227 |
| 5,748,493 | 5/1998 | Lightfoot et al. | 709/227 |
| 5,835,724 | 11/1998 | Smith | 709/227 |

*Primary Examiner*—Zarni Maung
*Attorney, Agent, or Firm*—Alfred W. Kozak; Mark T. Starr; Steven B. Samuels

[57] ABSTRACT

A Connection Library Interface for a Process-Intercommunication Manager and a Process-Intercommunication Element provides an improved interface generating enhancements in data communication operations between a Network Provider and a Ports Unit which is part of the Master Control Program of a computer system. An improved method of data transfer involves a Distributed Systems Service/Application unit which operates through the Ports File of a Master Control Program, then uses Connection Library Interfaces to communicate with a Network Provider for data transfer to and from underlying interfaces.

13 Claims, 8 Drawing Sheets

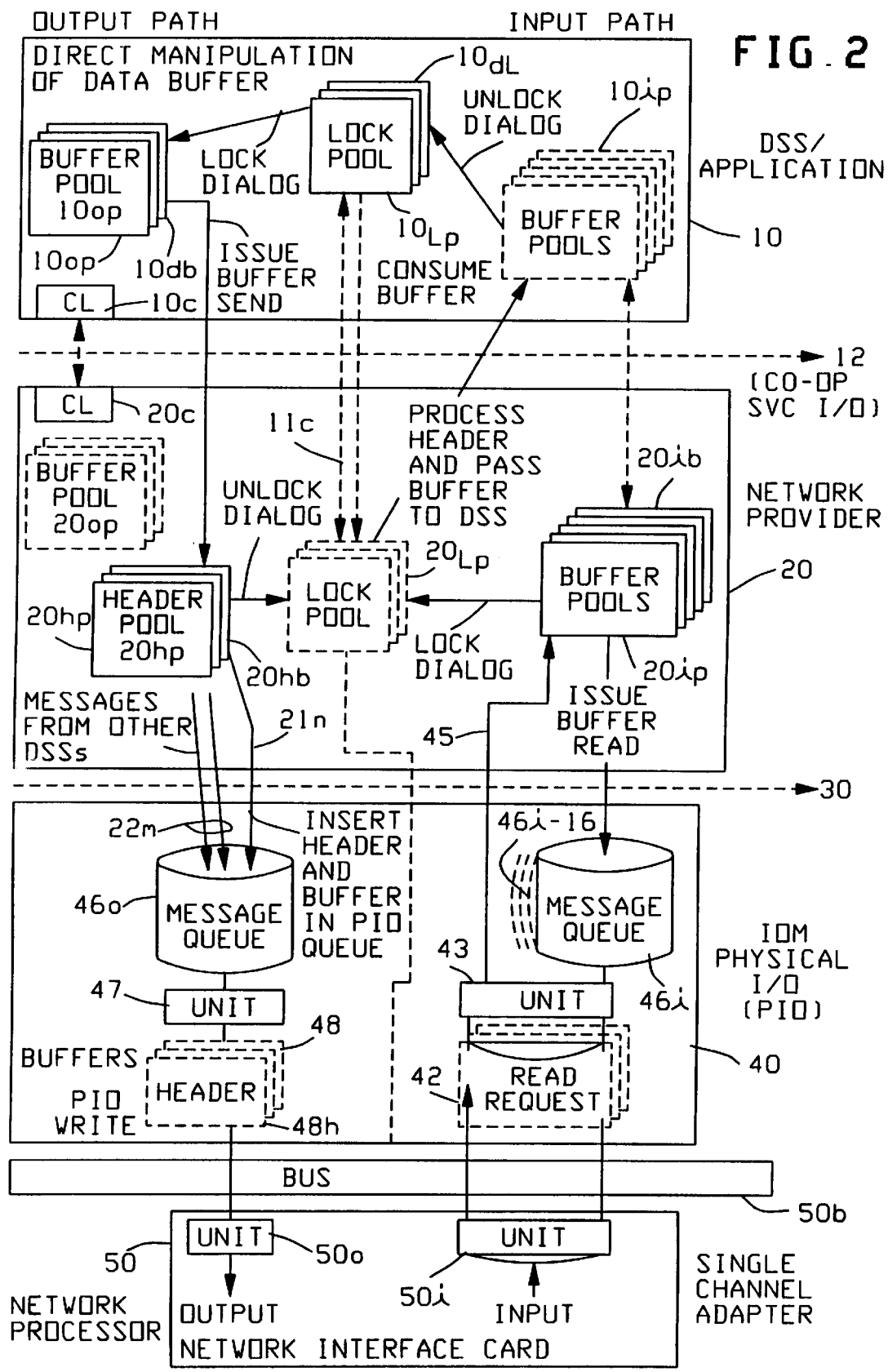

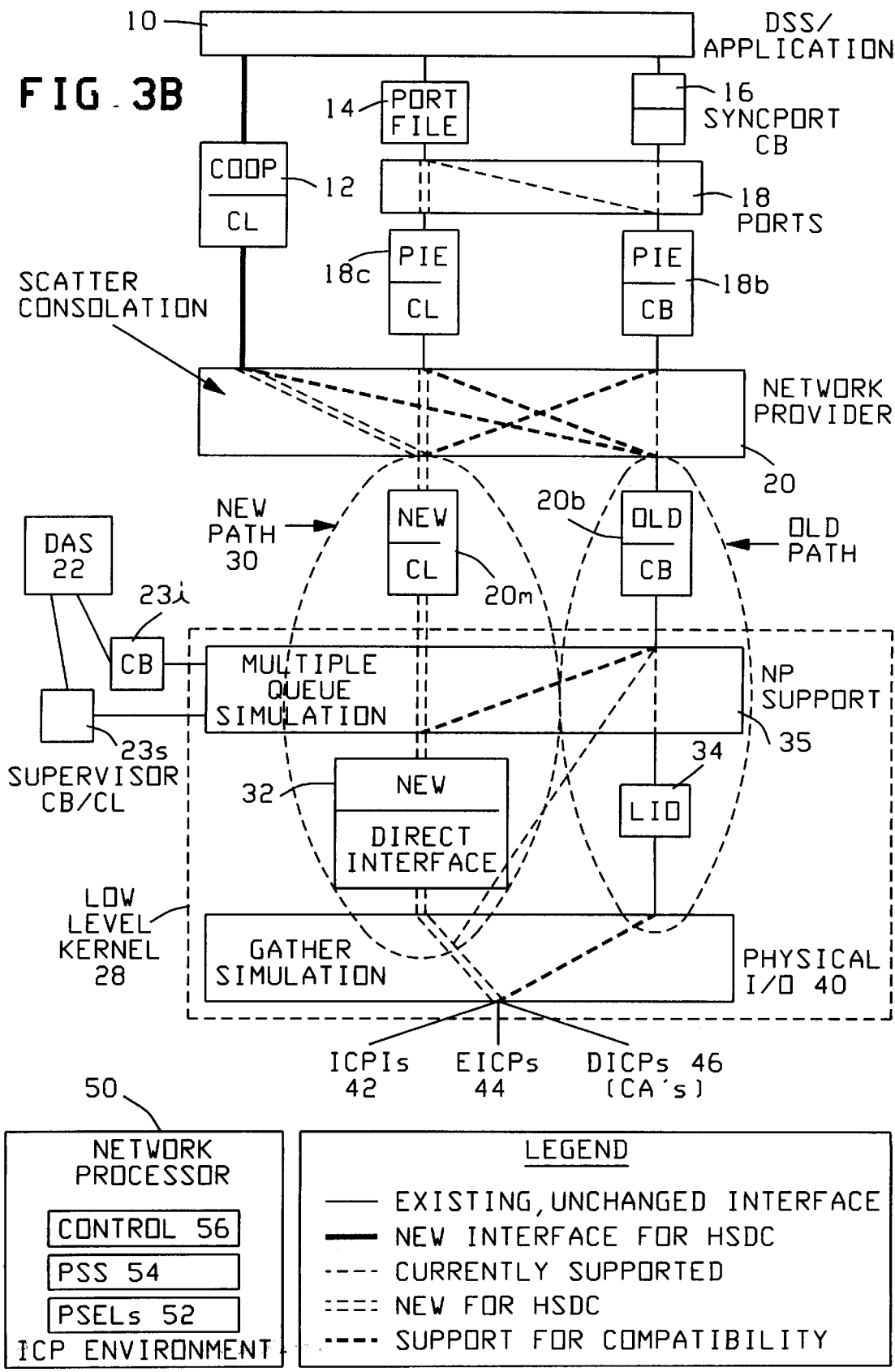

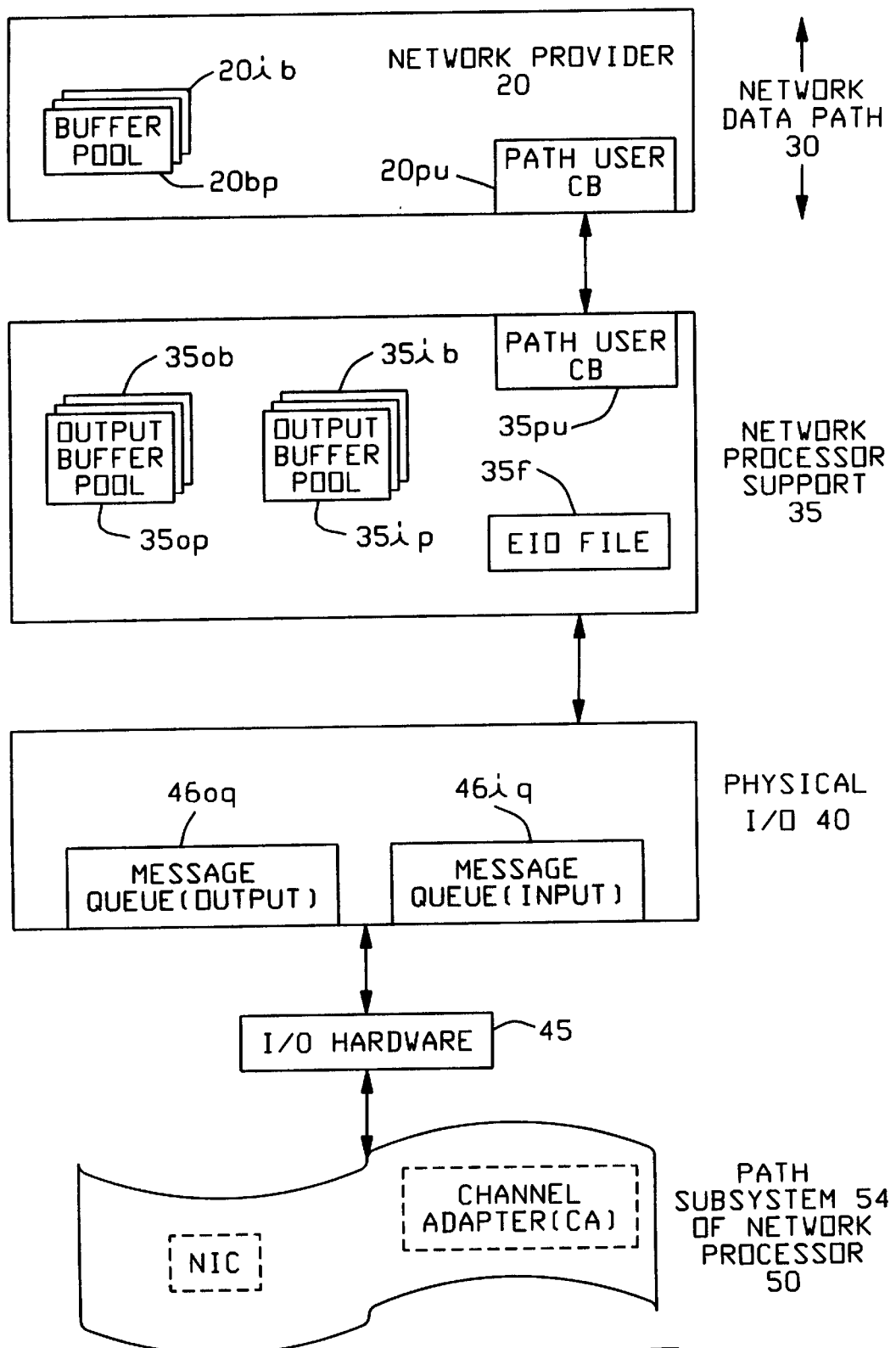
PRIOR ART FIG. 7

MULTIPLE INTERFACE DATA COMMUNICATION SYSTEM AND METHOD UTILIZING MULTIPLE CONNECTION LIBRARY INTERFACES WITH BUFFER AND LOCK POOL SHARING

FIELD OF THE INVENTION

The present disclosure relates to high-speed data communication systems having interfaces to provide performance improvements for Network Providers and their Users.

CROSS REFERENCES TO RELATED APPLICATIONS

This application is related to co-pending applications U.S. Ser. No. 09/060,650, filed Apr. 15, 1998, entitled "Method and System for Enhanced Data Communications Via Input Interface of Cooperative Service Interface" which is incorporated by reference, U.S. Ser. No. 09/060,649, filed Apr. 15, 1998, and now allowed, entitled "Output Interface Method and System for Enhanced Data Transfers Via Cooperative Service Interface", also incorporated herein by reference, and U.S. Ser. No. 09/060,651, filed Apr. 15, 1998, entitled "Network Data Path Interface Method and System for Enhanced Data Transmission," and U.S. Ser. No. 09/060,647, filed Apr. 15, 1998, and now allowed, entitled "Multiple Interface High Speed Data Com System and Method" also incorporated herein by reference.

BACKGROUND OF THE INVENTION

In the data communication field involving computers and networking, there is a basic concept of the "dialog", which in computing circles, involves the exchange of human input and the immediate machine response that forms a "conversation" between an interactive computer and person using it. Another aspect of the "dialog" is the reference to the exchange of signals by computers communicating on a network. Dialogs can be used to carry data between different application processes, and can be used to carry data over computer networks. In computer networking, dialogs can be considered to provide data communication between application processes running on different systems or different hosts. Further, dialogs can carry data between application processes running on the same host.

There is a generally recognized OSI (Open System Interconnection) standard for worldwide message transfer communications that defines a framework for implementing transfer protocols in 7 layers. Control is passed from one layer to the next, starting at the layer called "the Application Layer" in one station, proceeding to the bottom layer, over the channel to the next station, and back up the layers of a hierarchy which is generally recognized as having 7 layers. Most of all communication networks use the 7-layer system. However, there are some non-OSI systems which incorporate two or three layers into one layer.

The layers involved for network Users are generally designated from the lowest layer to the highest layer, as follows:

1. The Physical Layer;
2. The Datalink Layer;
3. The Network Layer;
4. The Transport Layer;
5. The Session Layer;
6. The Presentation Layer; and
7. The Application Layer.

The Application Layer 7 (top layer) defines the language and syntax that programs use to communicate with other programs. It represents the purpose of communicating. For example, a program in a client workstation uses commands to request data from a program in a server. The common functions at this Application Layer level are that of opening, closing, reading and writing files, transferring files and e-mail, executing remote jobs, and obtaining directory information about network resources.

The Presentation Layer 6 acts to negotiate and manage the way the data is represented and encoded between different computers. For example, it provides a common denominator between ASCII and the EBCDIC machines, as well as between different floating point and binary formats. This layer is also used for encryption and decryption.

The Session Layer 5, coordinates communications in an orderly manner. It determines one-way or two-way communications, and manages the dialog between both parties, for example, making sure that the previous request has been fulfilled before the next request is sent. This Session Layer also marks significant parts of the transmitted data with checkpoints to allow for fast recovery in the event of a connection failure. Sometimes the services of this session layer are included in the Transport Layer 4.

The Transport Layer 4, ensures end to end validity and integrity. The lower Data Link Layer (Layer 2) is only responsible for delivering packets from one node to another). Thus, if a packet should get lost in a router somewhere in the enterprise internet, the Transport Layer will detect this situation. This Transport Layer 4 ensures that if a 12 MB file is sent, the full 12 MB will be received. OSI transport services sometimes will include layers 1 through 4, and are collectively responsible for delivering a complete message or file from a sending station to a receiving station without error.

The Network Layer 3 routes the messages to different networks. The node-to-node function of the Datalink Layer (Layer 2) is extended across the entire internetwork, because a routable protocol such as IP, IPX, SNA, etc., contains a "network address" in addition to a station address. If all the stations are contained within a single network segment, then the routing capability of this layer is not required.

The Datalink Layer 2 is responsible for node-to-node validity and integrity of the transmission. The transmitted bits are divided into frames, for example, an Ethernet, or Token Ring frame for Local Area Networks (LANs). Layers 1 and 2 are required for every type of communication operation.

The Physical Layer 1 is responsible for passing bits onto and receiving them from the connecting medium. This layer has no understanding of the meaning of the bits, but deals with the electrical and mechanical characteristics of the signals and the signaling methods. As an example, the Physical Layer 1 comprises the RTS (Request to Send) and the CTS (Clear to Send) signals in an RS-232 (a standard for serial transmission between computers and peripheral devices) environment, as well as TDM (Time Division Multiplexing) and FDM (Frequency Division Multiplexing) techniques for multiplexing data on a line.

It will be seen that present-day communication systems generally will have a high band-pass capability of data throughput for high speed network technologies which may occur at rates on the order of 100 MB per second, to 1 gigabit per second.

However, sometimes the problems of delays or latency may be high. Latency is generally considered to be the time interval between the time a transaction issues and the time the transaction is reported as being completed. In certain systems having a high latency, the round-trip time for two clients communicating with each other to complete a data request can be on the order of milliseconds.

The delays in communication due to "latency" will be seen to occur from conventional communication systems due partly to overhead in the communication layers, and generally is especially due to latency in the layers below the Transport Layer 4, i.e., Layers 3, 2 and 1. In high speed data communication systems, the Transport Layer 4 is still seen to impart substantial latency in communications.

The present Connection Library Interface between the Network Provider and the MCP operating system involves specialized functions and operating sequences for enhancing the speed of dialog exchanges and for providing more efficient methods for data transfer.

A brief summary of certain interfaces in the background of the present Connection Library (CL) interface will be discussed initially starting with the Network Data Path interface 30 of FIGS. 1, 2, and 3A.

NETWORK DATA PATH INTERFACE (30): Currently as will be noted in FIG. 3B, Unisys Corporation's computer architecture supports two interfaces to the Network Provider (s) 20—the standard user-visible interface through the Port Files 14, and—a system software synchronous interface called Sync_Port CB 16 (Connection Block). Sync_Port users can avoid copying incoming data in certain cases and can make decisions about where to copy it because they are allowed to look at the data before copying.

The Sync_Port interface can also be used to eliminate processor switching in the input data path for certain applications. Often though, the strict rules about what could be processed in-line as part of notification of input, resulted in the process switch merely being moved into the Sync_Port user's code.

The BNA and the TCP/IP type Network Providers provide the Sync_Port interface (which is used primarily by COMs_PSHs and the Unisys-supplied DSS's), with a performance boost. "DSS" refers to Distributed System Services, while PSH refers to Protocol Specific Handler.

The Cooperative Services Interface (12) of FIGS. 1, 2, 3B and FIG. 5, provides an additional performance benefit over the Sync_Ports by allowing a Network Provider (20) and a DSS (10) to bypass the Port File (18) code in the Master Control Program 80 (MCP), by allowing it to share data and by relaxing the rules about what can be performed as part of an "input" notification.

The interface between the MCP's Port File 18 (FIG. 3A) code and the Network Providers (the PIE interface 18c) was earlier implemented as an old-style Connection Block 18b, FIG. 3B, (CB) so that by changing this to a "Connection Library" (CL), 18c, this provided a performance advantage by eliminating the MCP overhead required to access the entry points exported via a prior type of Connection Library (CB) using Connection Blocks.

Because Connection Libraries (CL) (see Glossary) can export data items in addition to procedures, this change also allows for the Port File Code and the Network Providers to share dialog-oriented locks. Such sharing allows an elaborate lock/deadlock avoidance code, previously employed, to be simplified greatly, thereby not only improving performance, but also closing numerous of the timing windows. Sharing locks in this way also obviates the need for several of the more complex interfaces in the priorly used interfaces.

The Unisys E-mode based portions of the Network Providers (20) were previously enabled to communicate with their ICP-based (Integrated Communication Processor—Glossary item 18) components via an interface provided by the NP Support, 35, FIG. 3B. The NP Support 35 provided a complex path Connection Block (CB) interface 20b which the Network Providers used to get the data when they wished to send into an I/O capable buffer, and the CB generated and parsed the QSP (Queue Service Provider) protocol, in order to "multiplex" the numerous dialogs (that the Network Providers had) over a single Physical Unit Queue.

In the new, improved architecture, "multiple queues" are now provided between the Unisys E-mode environment and a given Channel Adapter (CA) environment, thus obviating the need for this previous multiplexing function and eliminating the de-multiplexing bottleneck on the NP/Controller stack on the input.

Since the QSP (Queue Service Provider) protocol generation is very simple, that function is now moved into the Network Provider, 20. This re-distribution of function allows the NP Support 35 (FIG. 3B) to be "eliminated" from the Data Path. In fact, the double-dashed line through the NP Support 35 (FIG. 3B) is now accomplished by means of a Read/Write directly to the Physical I/O procedure 32 (FIG. 3B) providing transport to the Channel Adapter (CA) environment except in the case of the old Integrated Communication Processors (ICPs), where multiple queues still must be simulated in the NP Support 35, and FIG. 3B.

To avoid the necessity of copying data in order to assemble Network Provider-generated header data, and data from multiple-use buffers into one contiguous memory area, the ability to "Gather" data from multiple buffers on the output is added to the I/O processor in input/output module IOM 40. The Physical I/O 40 simulates "Gather" in cases where the I/O processor does not support it directly.

Additionally, a "Scatter" feature is provided so that a single incoming data message can be split across multiple buffers. This is used by the Network Provider(s) to ease their memory management problems, and they thus have a consolation code channel (in Network Provider NP 20, FIG. 3B) to cope with the cases where Scatter is not provided by the I/O processor.

As a result of the improvements to the Network Data Path Interface 30, there is a reduced need to copy data, throughput performance is enhanced, more transmissions can occur simultaneously by reducing routing overhead at destination end points, there is a greater capacity for multi-threading and the protocol stacks can more efficiently handle the use of buffers.

FIG. 3B shows a specialized drawing of FIG. 3A where a number of interfaces are shown between DSS 10 and the Network Provider 20. The cooperative interface (12) with Connection Library connects directly between the DSS 10 and the Network Provider 20. The DSS 10 also has connections to Ports 18 through the Port File 14 and also via the Sync Port Connection Block 16.

Ports Unit 18 provides two types of connections to Network Provider 20. These are seen as the PIE-CL 18c (Process Inter-Communication Element Connection Library) and also the PIE-CB 18b (Process Inter-Communication Element Connection Block). Further in FIG. 3B, there is seen the low level kernel 28 which has the Network Processor Support (NPS) Unit 35 and which connects to Physical I/O 40 through the Logical Input/Output, LIO 34. Additionally, the Network Processor Support Unit 35 also connects to the Physical I/O 40 via the new Direct Interface 32.

FIG. 3B shows the elliptical dotted lines indicating the "old" prior data transfer pathway which involved the Connection Block 20*b*, the Network Processor Support 35 and the Logical I/O 34. Similarly, an elliptical dotted line indicates the "new" path which involves the new Connection Library (CL) System 20*m* which also operates through the Network Processor Support 35 and through the new Direct Interface 32 over to the Physical I/O 40 (Input/Output Module, IOM).

The Physical I/O 40 communicates with a number of processors which are indicated as Network Processors 50 such as the Integrated Communication Processor 42, the Emulated Communication Processor 44 and the DICP 46 (the Direct Integrated Communication Processors) or each of which also include can include the Channel Adapters (CA).

The Network Processors (FIGS. 3B) are involved in a Network Processor environment 50 which utilizes a Control Unit 56, a Path System Service 54 and a Path Select Unit 52.

As seen in FIG. 3B, a Network Provider 20 provides for "scatter consolation" functions and further indicates various data paths which are indicated with the dotted lines to indicate support for compatibility and the small vertical dashed lines which indicate the new paths for high speed datacom operations.

Likewise, the Network Processor Support (NPS) Unit 35 enables multiple queue simulation functions and also indicates, via the small dashed lines, channels for high speed data communications. The heavily dotted lines indicate support for compatibility between the new connection library system 20*m* and the old connection block 20*b* system.

A Distributed Application Supervisor (DAS 22) connects to the kernel 28, while also providing output to a path input control for CB, 23*i*, and a Supervisor CB/CL control 23*s*. These last two blocks feed to the Network Processor Support Module 35, which provides an output to the Logical I/O (LIO 34) and to the Physical I/O 32, and thence to I/O 40, whereby the Physical I/O 40 is a Simulation "Gatherer" to provide output to: the Integrated Communication Processor 42; or the Emulated Integrated Communication Processor 44; and/or to the Direct Integrated Communication Processor 44, and/or to the Direct Integrated Communication Processor 46, which provide communication to Channel Adapters (CA) in a Network Interface Card (NIC) of Network Processor 50.

Thus in summary, the architecture of FIG. 3B shows the old data path through the Connection Block 20*b* which is now supplanted by the new data path 30 which utilizes the Connection Library 20*m*. However, as was indicated earlier, the architecture of FIG. 3B may permit the use of the old path in addition to the use of the new path in order to provide compatibility for older systems which are not oriented to the new Connection Library Data Path Interface.

SUMMARY OF THE INVENTION

The improved interface designated as the Connection Library Interface for a Process-Intercommunication Manager and a Process-Intercommunication Element provides enhancements in data communication operations between a Network Provider and a Ports Unit which is part of the Master Control Program of a computer system.

Earlier systems utilized a Connection Block Interface between the Ports Module of the Master Control Program and a Network Provider which communicated outward to underlying interfaces of the Network. The presently developed Connection Library Elements for the Process Intercommunication Manager and Process Intercommunication Element of the new interface eliminates several layers of software and additionally reduces much of the earlier latencies that occurred in the Connection Block Interface.

The improved system and method involves a Distributed Systems Service/Application unit which connects through a Port File to a Ports Unit of the Master Control Program of the computer system. Then using the new Connection Library Interfaces, the Ports Unit can communicate with a Network Provider which also has corresponding Connection Library Element Interfaces. A Network Provider can then communicate to other interfaces.

Another configuration which is implemented is a combination of the new interface path involving the Connection Library Elements in combination with the earlier paths involving Connection Blocks, in order thus to make the system versatile enough to not only handle new computer systems, but to be compatible also with some of the older developed computer systems. The older path systems required the use of a Network Processor Support Unit and Logical I/O, while the new Connection Library path can dispense with the use of the Network Processor Support Unit.

The newly provided Connection Library functionality provides support for dialog initiation and for dialog termination. It also allows the exchange of information to old dialogs associated with the Connection Library. The Connection Library also functions to allow the Ports unit and the Network Provider to share buffer pools, and also to share lock pools which eliminates the need for extra buffers and lock pools, and helps to reduce latency in the data transfer operations.

The Connection Libraries can export both data items and additionally can export procedures, thus, this also permits the code in the Port File and the Network Providers to share dialog-oriented locks. This sharing permits elimination of previous elaborate lock-deadlock avoidance code and now permits greater simplicity and software operations, thus improving performance and reducing the need for numerous timing windows.

The basic improved PIM/PIE interface in its simplified non-combinative form, eliminates the use of a Network Processor Support Unit and can operate by enabling communication between the Ports Unit and a Network Provider, while also utilizing the services of the DSS/Application unit.

BRIEF DESCRIPTION OF THE DRAWINGS

FIG. 2 is a networking software architectural diagram used to illustrate elements and functions of a Cooperative Service Interface (12) and which receives Inputs and sends Outputs via a Network Data Path (30) to a Network Interface Card (50);

FIG. 3B is a specialized drawing of a data communication system showing a new form of Network Data Path Interface using the new Connection Library Interface while maintaining a system also supporting an earlier Connection Block Interface;

FIG. 7 is a drawing of an earlier implementation of the Network Data Path Interface integrated to work with the Network Processor Support unit.

GLOSSARY LIST

Figure 1:
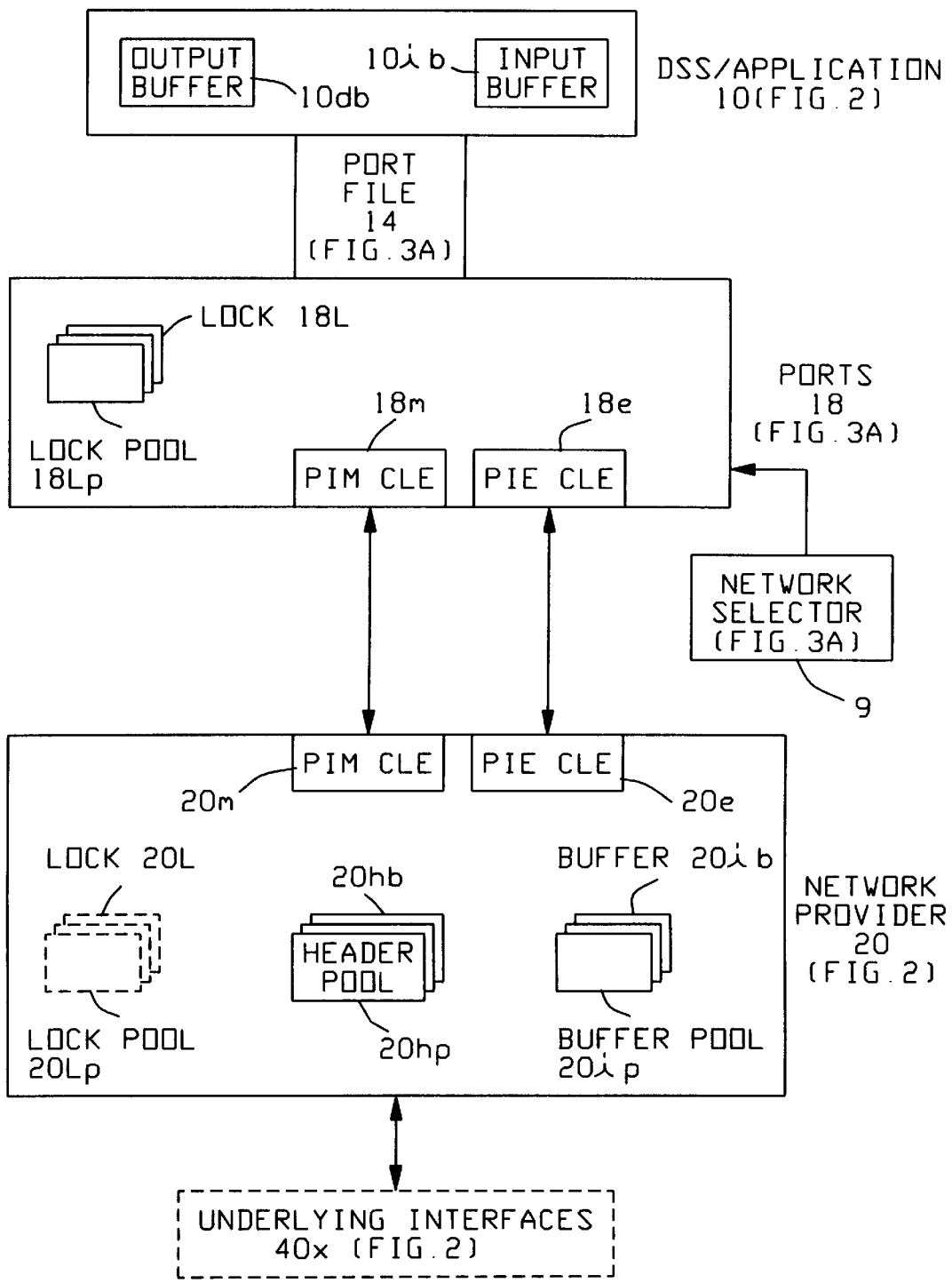
FIG. 1 is a drawing of the improved Connection Library Element PIM-CLE, PIE-CLE Interface.

1. Distributed System Services (DSS): One of a collection of services provided on Unisys Host computers to support communication across multi-host networks. DSSs can be services such as file handling, station transfer, and mail transfer.
2. Cooperative Service Interface (Co-op): A systems level, connection-library based interface which allows the Distributed System Services (DSS) to communicate across the network with their peers. A system and method for using the services of a network provider to communicate with another instance of themselves somewhere else enabling communication to occur across a network.
3. Connection Library (CL): This is method of connecting two code files together at run time so that they can use each other's services. The Connection Library is a collection of one or more Connection Library Elements and a library template. The "Library Template" is a structure that is built by the compiler and maintained by the Master Control Program (MCP) that determines what the procedures and functions and items that you are trying to import from the library. This involves a multiplicity of Connection Library Elements. A Connection Library (or Server Library) permits access to another program's exported procedures and data. Connection Libraries allow one or more instances of two-way access, to the other program, and from the other program to the Library. Server Libraries allow only one instance of one-way access.
4. The Port File: A Port File is an interface that allows programs to talk to their peers on the same system or other systems and which is based on the file interface. The "file interface" is used for disks, tapes, and card readers and all the traditional peripheral types and the Port File provides adaptation of that interface for interprocess communication (IPC).
5. Sync Port Connection Block (CB): This was an older version of the cooperative interface which did not permit lock sharing or buffer sharing. Connection Block later evolved into more versatile operations as Connection Libraries and likewise the co-op interface was the evolution of improvements to the Sync Port Interface. The Sync Port Interface uses connection blocks while the more highly developed co-op interface uses Connection Libraries whereby the new co-op interface used buffer sharing, lock sharing and fault management.
6. Provider: Provider is just a system or operation or a piece of software that provides a service. It could be looked at as a collection of software that provides a service.
7. Process Intercommunication Element-Connection Library (PIE-CL): This is the interface used by the port interface software to talk to the Network Provider.
8. Process Intercommunication Element-Connection Block (PIE-CB): This is an interface used by the port interface software to talk to the Network Provider using an earlier form of technology designated as the Connection Block technology. The old PIE-CB technology did not provide for lock sharing and buffer sharing but the new PIE-CL (Connection Library) does provide lock sharing and buffer sharing.
9. Scatter Consolation: This code is put into Network Processor Support software to make a machine which does not have hardware scatter capabilities appear to have scatter capabilities. Scatter is the operation of taking data coming in off an I/O bus and putting it into multiple different areas in the local memory, that is to say, it is scattered around.
10. Distributed Application Supervisor (DAS): This is a unit that has a function of determining what software should be loaded into the Channel Adapter, into the integrated communications processor (ICP) etc. It also is used to manage exceptions that it may notice, for example, such as software that is running in the ICP, which may detect some error and then the DAS must determine how to handle the error.
11. Network Support: A process which controls when Network Providers and DSSs are initiated and terminated and which routes network-related operator entered commands and their responses.

11a. NP Support: Network Processor Support. The software which allows Network Provider access to the Input and Output Queues, which contains Multiqueue Simulation software, and which multiplexes and demultiplexes data across the single input and output queues used in an earlier method of implementation of functions for a Network Data Path Interface.
12. Multiple Queue: There are I/O queues between the host memory and Channel Adapter card. The present system can define up to 16 queues in its I/O architecture which is an advantage over the earlier use of only two queues which involved one queue for input and one queue for output. Putting in multiple queues, gave each module a direct queue so that there was no need for multiplexing over one queue and then de-multiplexing on the other end. Thus, now each receiver would have its own queue.

12a. MQ simulation software is in NP Support which "simulates" Multiple Queues on systems where the hardware does not support multiple queues.
13. Connection Block (CB): This is a method of connecting two code files together at run time so that they can use each other's services. It is similar to a file or a task or a job or a database or any of these types of abstract objects that are used in a given program. A CB is a less robust implementation of a Connection Library (CL).
14. Supervisor CB/CL: This involves the supervisor Connection Block/connection library and this is the interface object that the NP Support uses to talk to the Distributed Application Supervisor (DAS).
15. Physical I/O: The Physical I/O system is part of the Master Control Program of the Unisys computer system hierarchy. This involves the software that talks to the hardware controllers. For example, it operates so as to indicate that it wants sector 35 off disk 22 and seeks 57 bytes from that location.
16. Logical I/O (LIO): Logical I/O is also part of the Master Control Program (MCP) and involves the file interface code. Whenever writing is done to a file or read from a file in a program, the system is actually calling the MCP module called Logical I/O. The Port File interface code is also a subpart of Logical I/O. It has its own module but provides Logical I/O functions for the Port Files. The regular Logical I/O operates with disks, tapes, printers, card punches and other peripherals.
17. Gather Simulation: This is provided by code in the physical I/O. Gather is an output operation whereby the I/O management module goes to the memory and gets certain messages or data from one location and then from another location and from another location and puts it together in order to pass it on to a particular peripheral such as a tape.

Contrarily, the "scatter" operates the other direction, for example, the IOM will indicate that it has a stream of bits from a particular tape and it is then going to put some of this information here in one place, some of it here in another place and some of it in a not her or third place and that is the "scatter" operation.

18. Network Processor: Examples of these units are Channel Adapters, Integrated Communication Processor (ICP), Emulated Integrated Communication Processor (EICP), DICPs and Network Interface Cards. An integrated communication processor is often called a Data Link Processor (DLP) and, in particular, ICP is a Data Link Processor that has a Network Interface Card (NIC) associated with it. Channel Adapters also have Network Interface Cards.

18a. An emulated ICP is a portion of software that "pretends" to be the Network Interface Card on a system that operates on the basis of emulating the I/O mainframe system, such as was done in the Unisys Micro-A or Unisys A-7 and other systems. These systems do not supply any real I/O hardware but rather provide software that emulates the hardware. Thus an emulated ICP is a portion of software that pretends to be and operate as if it were ICP/DLP.

18b. Direct Integrated Communication Processor (DICP): The DICPs are also actually known as "Channel Adapters" and they are the units that replace the datalink processors (DLP) in the new I/O architecture. Thus a direct integrated communication processor is a Channel Adapter that does networking operations.

19. Interfaces—Cooperative System Services: They involve (i) input data path for dialogs associated with the Connection Library between the Network Provider and the DSS; (ii) an output data path for dialogs associated with the Connection Library between the DSS and the Network Provider.

20. Channel Adapters (CA): A Channel Adapter is a device that enables hardware using two different types of communication channels to communicate.

21. Path Sub-System (PSS): This is the peer of NP Support that runs in the integrated communication processor (ICP), the emulated integrated communication processor (EICP) or the direct integrated communication processor (DICP). This is the unit that the Network Processor Support talks its protocol to.

22. Protocol Stack Extension LoQic (PSEL): This is part of the network provider involving its protocol stack that runs in the integrated communication processor (ICP).

23. COMS: This represents a communications management system. It is a Unisys message control system that supports processing for a network on the Unisys ClearPath NX server. It is described in the reference: Unisys A Series Communication Management System (CMS) operations guide, May 1989, Doc. 1154523.380.

24. Protocol Specific Handler (PSH): This is software which talks to items such as communication processors in order to get terminal access.

25. Network Selector Module (NSM): This is part of Ports Module in the Master Control Program (MCP). Its purpose is to take a User's File Open Request, a Port File, and determine which Network Provider should be used. The Network Selector Module 9 (FIG. 3A) selects a Network Provider 20 to use for a specific instance of the port interface.

26. Library Template: A structure built by the compiler and maintained by the MCP to determine the procedures, functions and items to be imported from the Connection Library.

27. Pine: A pipe is a path (input or output) between a Network Provider and the Channel Adapter/Integrated Communications Processor (CA/ICP), which is associated with a specific end point. A pipe can be associated with a connection end point on the ICP/CA for output or to a specific entity end point (upper layer protocol) in the Network Provider for input. The use of pipe is defined by the Network Provider and the CA/ICP and the QSP IDs which are used to uniquely identify each pipe. QSP refers to the Queue Service Provider. A pipe may or may not map directly to a specific queue.

28. Queue: A queue number identifies a specific I/O queue relative to a particular ICP/CA (Integrated Communications Processor/Channel Adapter). Each queue is an independent list of I/O requests. Within each queue, requests are ordered. There is no ordering of requests in different queues. The ICP/CA is given one request at a time (the one at the head of the list) from each queue.

29. Queue Service Provider (QSP): This is a unit that provides the queue service to a requester. It is basically a protocol that puts everything into one queue and takes it all back off. That protocol is called QSP protocol (Queue Service Provider).

30. Pipe ID: A field in the QSP protocol which identifies the logical pipe. It is used for multi-queue simulation.

31. Dialog: A dialog or dialogs are operations which carry data between different applications processes. Dialogs can be logically set to carry data over a computer network. In a computer network, dialogs provide data communication between application processes running on different end systems or hosts. Dialogs can also carry data between application processes running on the same host. Dialogs are implemented by the use of the various functional layers for example, Application, Presentation Session, Transport, Network, Link and Physical, which are used in data communication networks to provide various services and also reliability. Each layer will have its own particular protocol and range of fundamental instructions in order to provide services. Dialog operations and particular features may sometime include the scatter support and gather support.

32. Connection Library Element: This is one element of the Connection Library which may involve multiple elements. It provides implementation of an interface, much like the FILE object in a program not the actual file on disk, but rather it is an OBJECT in the program that allows access to an actual file on the disk.

33. Network Provider: A software operation which implements the Presentation, Session, Transport and Network Layer portions of the relevant protocol stack in the MCP environment.

34. Lock: An object which can be used to ensure that only one entity is accessing a shared resource or object at any given time.

35. PIE-CL: Process Inter-communication Element for the Connection Library. (See item 7)

36. PIE-CB: Process Inter-communication Element for the Connection Block. (See item 8)

37. PIM-CL: Processor Inter-communication Manager for Connection Library.

38. PIM-CB: Processor Inter-communication Manager for Connection Block.

39. Open_Sequence: is a protocol dependent exchange of messages which establishes a dialog.

40. Interface Name: This is a library attribute defined in Unisys Corporation's published document 8600 0494 entitled "ClearPath HMP NX and A Series Task Management Programming Guide".

41. E-Mode: The operator set for Unisys Corporation's A-Series computers.
42. E-Mode Environment: The operating environment of a machine which supports E-Mode and runs the Master Control Program (MCP).
43. EIO File Object: A file system-based mechanism used to associate an instance of Network Processor Support (FIG. 3B, element 35) with a Network Processor (Glossary Item 18).
44. Link Library: A function call of the (Master Control Program) which creates a binding link between two Connection Libraries (CL's).
45. Data Path CL (30, FIG. 3B): The Connection Library object used by the Network Provider to talk to Network Processor Support and Physical I/O or vice-versa. It is shown as element 30 in FIG. 3B.

GENERAL OVERVIEW

To place the present Connection Library Interface in perspective, a brief review of the overall context of multiple computer systems and networks will be described in connection with FIG. 3A.

Figure 3A:
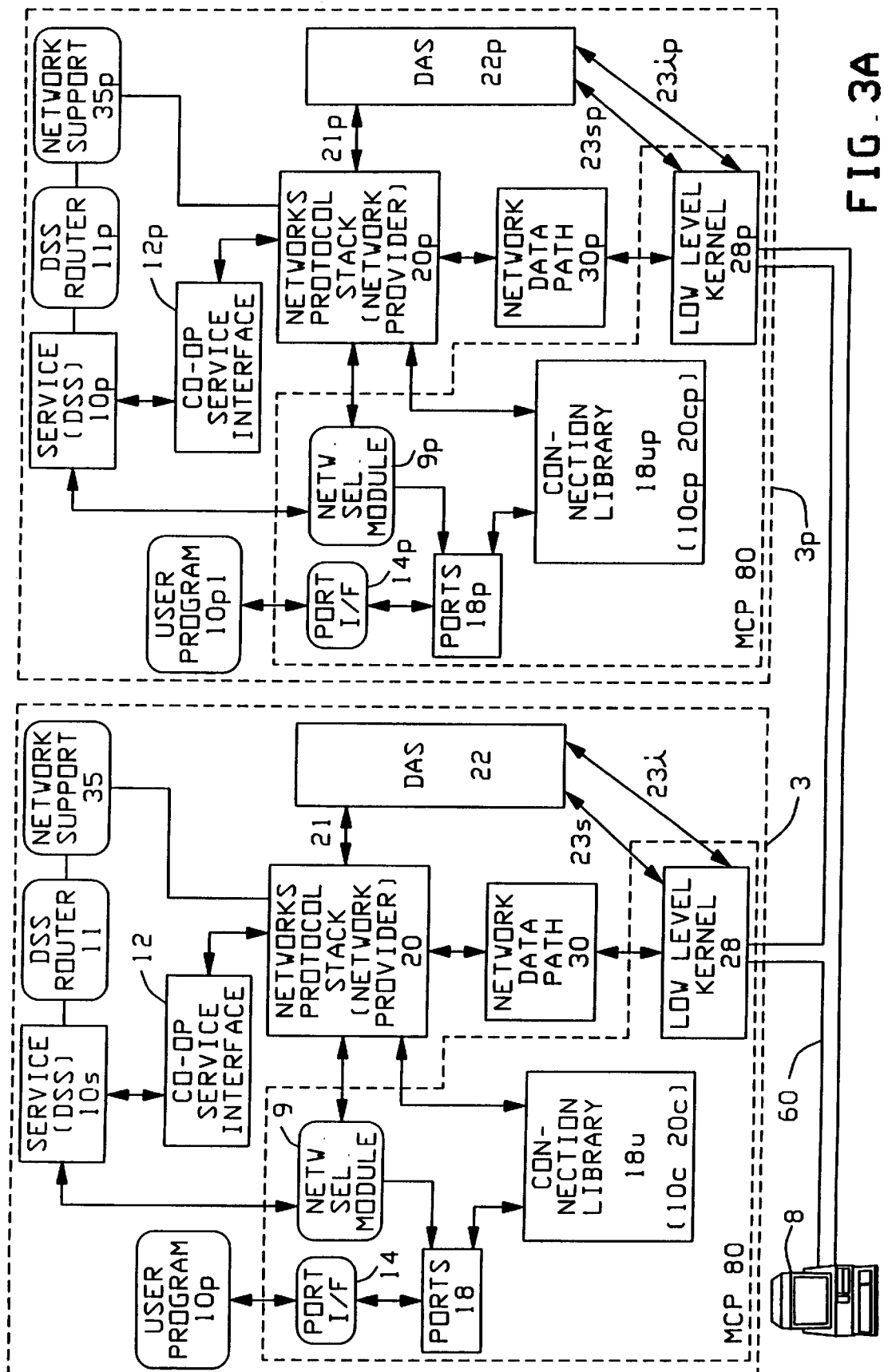
FIG. 3A is a multiple peer network drawing showing the placement of new PIM/PIE CL Interface in each of two peer systems on a computer network.

FIG. 3A is an overview of specialized high speed datacom system where a User terminal 8 utilizes the interconnecting bus 60 to connect to a first computer system 3 and a second computer system 3p which is basically a duplicate copy of the first network.

There are different categories of elements involved in FIG. 3A which can be summarized as follows:

(a) Network Providers designated NP, which may involve the TCP/IP protocol, or other protocols.

(b) The Users of the Network Providers, the DSSs (Distributed System Services), COMS (Communication Management System), and PSHs (Protocol Specific Handlers), which interface terminal-related protocols to the COMS program defined in the Glossary, (item 23).

(c) Master Control Program (MCP), which is the main operating system of which one portion includes the Network Selector.

(d) The Network Support items, such as the interface to the Network Selector, the DSS Router Interface, and the network software installation and configuration.

Referring to FIG. 3A, it will be seen that each computer system 3 and 3p is composed of correspondingly similar modules which can be described below for example, in connection with the network 3, of FIG. 3A.

The User terminal 8 will communicate with the low-level kernel 28 of computer system 3 which is in communication with the network data path 20n which communicates with the network's protocol stack 20 (Network Provider). The network's protocol stack 20 has a communication line 21 to the DAS 22, (Distributed Application Supervisor) which has two communication lines to the low-level kernel 28, these communication lines being shown as 23s and 23i. The network's protocol stack communicates to a Connection Library 18u which connects to the Ports Module 18. The Ports Module 18 is in communication with the Port Interface 14 which is in communication with the User program 10p.

FIG. 3A involves a service networking operation, where for example, there are two peer computer systems 3 and 3p. One computer system such as computer system 3 will have a User terminal 8 which connects to it, and also connects to the second computer system 3p.

For example, the User terminal 8 may have a payroll application program, while the databases for this may reside in computer system 3 or computer system 3p.

The low-level kernel 28 and 28p are software interfaces which connect to the computer networks. In the User terminal 8, there could be an equivalent interface called the Network Interface Card.

Each of the computers contain multiple protocol engines, each of which supports a protocol, such as TCP/IP, UDP (User Datagram Protocol) and other internet protocols.

The Ports 18 and 18p are file interface-based software which allows programs to send messages to other programs across the network, so that programs can talk to other programs. The software in the Port Interfaces 14 and 14p, are basically placed in the MCP or Master Control Program, and they operate as system software within the MCP, 80 FIG. 3A.

The operations of FIG. 3A function such that the computer system 3 could become a sender and send a message to computer system 3p which could become a receiver, after which the computer system 3p becomes a sender and sends back an answer to computer system 3 as the receiver.

In FIG. 3A, each of the computer systems 3 and 3p will have a DSS Router 11 and Network Support Module 13. Further, a Port 18 associated with port interface 14, is placed in communication with a Network Provider 20 by the Network Selector Module 9.

It should be understood that the computer system 3 and the system 3p may be a long distance apart, such as in different cities or different countries.

The Port Interfaces 14 and 14p are described in the Unisys I/O Subsystem Programming Guide, Document number 86000056, published June 1995.

Figure 5:
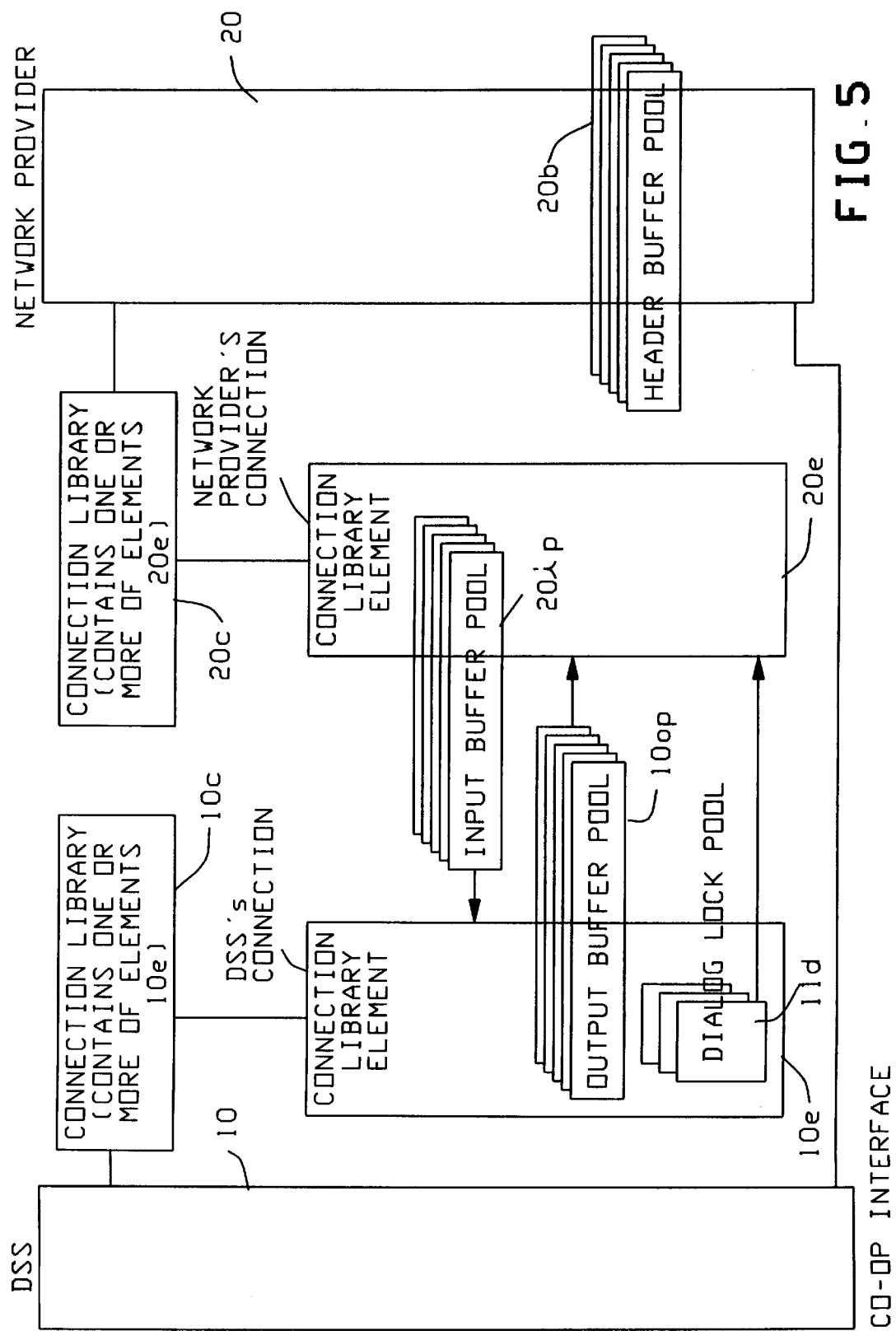
FIG. 5 is a diagram illustrating how buffers and locks are shared between a Distributed System Service (DSS) and a Network Provider using a Connection Library facility of a Cooperative Service Interface.

As seen in FIG. 5 and FIG. 2, there is a Cooperative Service Interface method and system 12 which involves the transfer of dialog messages between a Distributed System Service (DSS) 10 and a Network Provider 20.

The DSS/Application 10 can generally be any software program, but typically is an implementation of the "Application Layer" (Layer 7) which defines the language and syntax that a program uses to communicate with another program as part of the OSI (Open Systems Interconnection Standards). The Application Layer may involve services such as FTP (File Transfer Protocol), FTAM (File Transfer and Management) and messaging protocols such as mail, Telnet and other terminal access protocols.

The Network Provider 20 of FIGS. 2, 3A and 5, is also often referred to as Network Transport Protocol Implementation such that the Network Provider (NP) is an implementation of the hierarchical layers (6,5,4,3) "below" the Application Layer 7. The Network Provider thus implements the protocol stack for the lower layers such as TCP/IP, UDP/IP, BNA or the OSI Presentation layer down.

The Network Provider 20 encompasses the Presentation (Layer 6), the Session (Layer 5), and the Transport (Layer 4), and where the Datalink (Layer 2) is implemented in a Network Processor in the Network Interf ace Card 50 of FIG. 2. The Network (Layer 3) is typically implemented in the Network Provider, but also may be implemented in the Network Processor.

The Cooperative Service Interface 12 and its method of operation will be seen in the broad view of FIG. 3A, as the interface between the Service Module 10s, also called "DSS" (Distributed System Service), and the Network Provider 20, also called the "Network Protocol Stack". Thus, the Cooperative Service Interface 12, is the programmed interface of interconnecting operational activities between the DSS 10 and the Network Provider 20, of FIG. 6.

A brief overview of the Cooperative Service Interface 12 is shown in FIGS. 2 and 5 where the Distributed System Service 10 is interrelated to the Network Provider 20 through use of a set of buffer pools, and a lock pool.

Thus, in FIG. 5, the DSS 10 has a Connection-Library Element 10e, which has a dialog lock pool 11d, a reference to which is transmitted to the Network Providers Connection-Library Element module 20e. A Connection Library $10_c$ contains the DSS's Connection Elements 10e.

Further, the Network Provider 20 has a header buffer pool 20b which is associated with the Network Provider's Connection Library $20_c$. The Connection-Library Element $20_c$ has an input buffer pool $20_{ip}$, whereby data is made available (shared) to the DSS Connection-Library Element 10e. Likewise, the DSS Connection-Library Element 10e has an output buffer pool $10_{op}$, whereby data is made available (shared) to the Network Provider's Connection-Library Element 20e. The Connection Library 20c contains the Network Provider's Connection Elements 20e.

The basic functional design of the High Speed Data Com (HSDC) Network Data Path Interface 30 is seen in FIG. 2 with use of the Connection Libraries 10c, 20c (CL) of FIG. 2 which use the elements 10e and 20e of FIG. 5. The general purpose is to implement performance improvements for Network Providers.

The improved Network Data Path Interface 30 (FIG. 6) consists of the interface functions between the Network Provider 20 (NP), and the Physical I/O 40; Network Provider 20, and the Path Subsystem 54, FIG. 3B; of Network Processor 50; the Physical I/O 40, and the Controller 56; and Protocol Specific Extension Logic (PSEL), 52 (FIG. 3B).

The Interface implementation of FIG. 3B includes:

(a1) moving buffer management responsibility from the prior NP Support 35 (FIG. 3B) over to the Network Provider 20, or to the DSS 10 (Distributed System Service). In effect, the need for the Network Provider Support 35 of FIG. 3B is eliminated.

(a2) replacing the current Connection Block Interfaces with Connection Library interfaces which use CLE's (Connection Library Elements, FIG. 5).

(a3) providing support of multiple area functionality in the Physical I/O.

Figure 6:
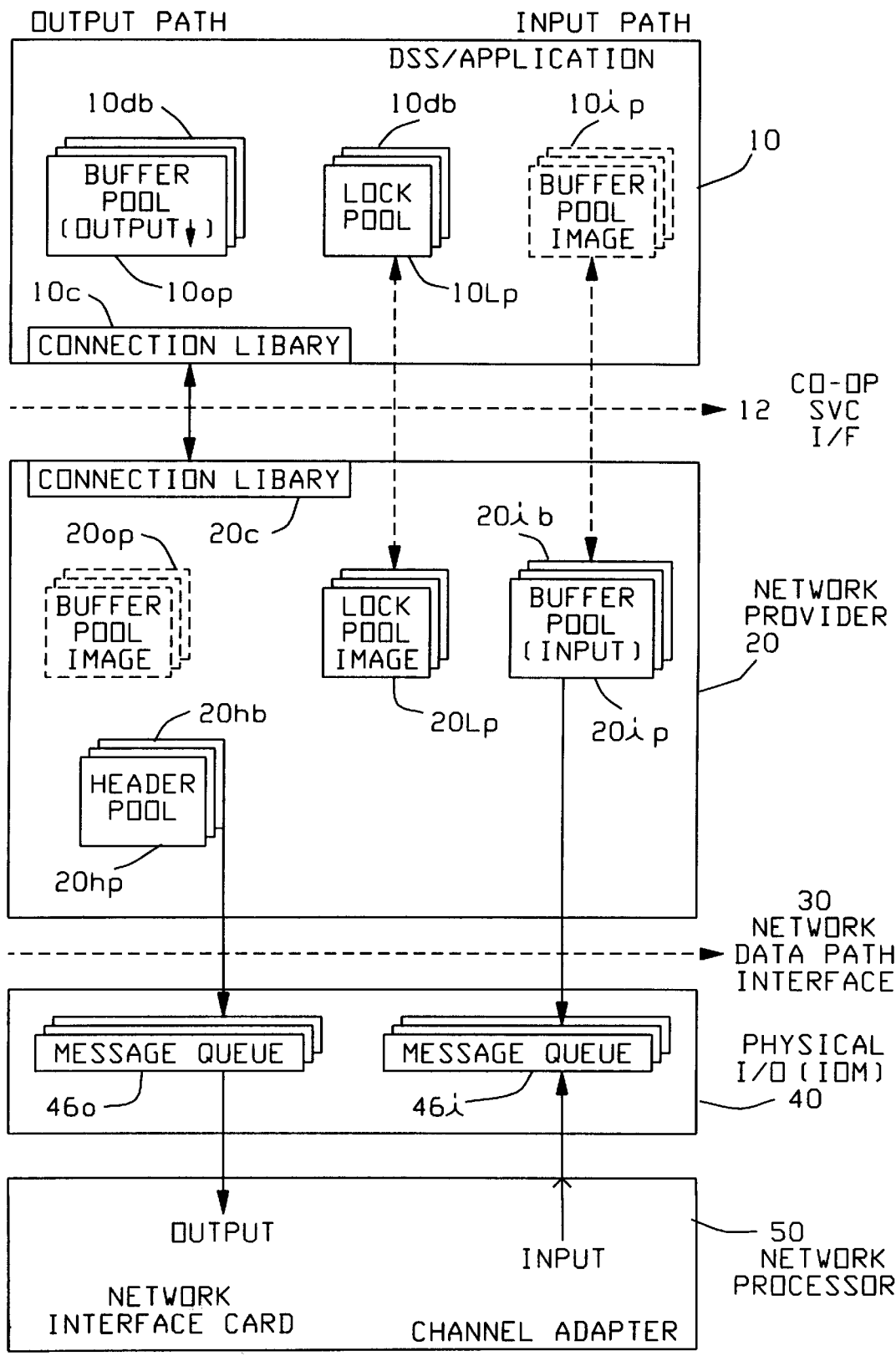
FIG. 6 is a drawing showing the Connection Library Interfaces (of FIG. 5) integrated to the other interfaces of the high speed datacom system.

FIG. 6 is a generalized diagrammatic sketch showing the relationship of the Network Data Path Interface function 30 to the DSS 10, the Network Provider 20 and the Cooperative Service Interface 12 which cooperate to enable Input data transfers and Output data transfers from and to the message queues of the I/O 40 and Network Processors to supporting Channel Adapters (CA's) holding a Network Interface Card (NIC). The detailed operational functions are later described in connection with FIG. 2 which involves a more detailed description of the improved high speed datacom operations.

AREA INVOLVEMENT: The implementation of this datacom system involves the following entities:

(i) Network Processor Support 35 (FIG. 3B) (now eliminated, except for compatibility, when added for use of earlier systems);

(ii) Network Providers 20 (TCP/IP, BNA, SNA).

(iii) DSS (Distributed System Services), 10.

(iv) Network Processor (Controller and Path Subsystem), 50.

(v) MCP 80 (Master Control Program) (FIG. 3A).

HARDWARE COMPATIBILITY: This system will provide for a relationship between the Multi-Area I/O feature, plus the Unisys Corporation A-Series physical I/O model, in addition to providing relationships between multiple pipes and the Integrated Communication Processors with Channel Adapters (ICP/CA).

COMPATIBLE SOFTWARE: The High Speed Data Com (HSDC) version of the Network Processor's Support 35 runs on earlier versions of Master Control Programs (MCP). The QSP (Level 2) is only supported on E-mode level Gamma and Delta systems running the MCP containing the High Speed Data Com changes provided herein. Network Providers and the Channel Adapter (CA) firmware are required to be at the same level. QSP refers to Queue Service Provider.

SPECIAL FEATURES: NETWORK DATA PATH INTERFACE (30)

1. New faster lower level interfaces between Network Providers and Physical I/O. This puts some added burdens on the Network Provider, the least of which requires that I/O length be appropriate for the device. FDDI Channel Adapter'S (CA) require I/O lengths to be "even multiples" of 4 bytes.

2. Certain IOMs are changed to support the Multi-Area I/O.

3. A rudimentary memory management support for the Multi-Area capable buffers are provided.

4. Channel Adapters can support 16 Physical I/O queues instead of the prior two queues.

FUNCTIONAL VIEW: The new Network Data Path Interface, (30, FIGS. 2, 3A) shows a lower level interface than was provided in prior implementations. In the new Network Data Path Interface, Network Providers 20 will deal directly with the Physical I/O 40 bypassing the Network Processor Support 35 and its associated overhead. The Network Processor Support 35 can optionally remain only to handle device ownership issues, to assist in initializing IOCBs (Input/Output Control Blocks), buffers and event references, and also to provide support for providers which still use the earlier-type interfaces.

The prior existing limit of two queues (one Input, one Output) between the E-mode environment and the Channel Adapter (CA) environment has now been expanded to 16 queues (15 for Input, 1 for Output), and these queues are statically assigned to various Network Providers. This eliminates a layer of routing in the Data Path and allows for more than one worker stack to process Input from a given device as required.

A "Gather Capability" is now added to the IOMs (Input/Output Modules) to allow sending of data contained in up to three separate 3-mode arrays without need for copying. This is particularly helpful for networking, which often deals with several layers of header and control information, in addition to the user data or to the DSS supplied data.

DESCRIPTION OF THE PREFERRED EMBODIMENT

Referring to FIG. 1, there is seen a diagram of the present Connection Library interface system and method functioning for the Process Inter-Communication Manager and the Process Inter-Communication Element. The DSS/Application 10 is seen to have an Input Buffer 10ib and an Output Buffer 10db. This unit connects via the Port File 14 (of FIG. 3A) over to the Ports Unit 18. The Ports Unit is seen to have a Lock Pool 18Lp and a specified selected lock 18L. In addition, the Ports Unit 18 has a Connection Library Element designated 18m which represents the Process Inter-Communication Manager—Connection Library Elements and also a unit 18e which represents the Process Inter-Communication Element-Connection Library Element. The Connection Library Element 18*m* and 18*e* respectively connect to a PIM CLE 20*m* and to PIE CLE 20*e* in the Network Provider 20. As was seen in FIG. 3A, the Network Selector 9 works to designate which particular Network Provider will be fed into the Ports Unit 18.

As was noted, the Process Inter-Communication Manager 18*m* and the Process Inter-Communication Element 18*e* connect respectively to the Network Provider 20 on to respective Connection Library Elements designated PIM 20*m* and 20*e*. The Network Provider 20 also manages a Lock Pool 20L*p* and a selected specified Lock Unit designated Lock 20L. The Network Provider 20 also has a header pool 20*hp* and a specific selected header pool unit 20*hb*. Additionally, the Network Provider 20 has a Buffer Pool 20*ip* and a Selected Buffer 20*ib*. The Network Provider connects to the underlying interfaces (as shown in FIG. 2) which are designated 40*x*.

The focus of the present disclosure involves a Connection Library interface whereby a Network Provider 20 can establish its identity with the Network Selector 9 in order to provide interprocess communication services. This interface uses a Connection Library mechanism and has the purpose of providing Network Providers with performance improvements over the priorly used Connection Block (CB) versions of the Process Inter-Communication Manager/Process Inter-Communication Element interfaces (PIM/PIE) which earlier introduced undesired amounts of overhead and latency in data transfers.

Thus as seen in FIG. 1, the new interface involves communication between the Ports Module 18 (of the MCP 80) and the Network Providers 20 (NP) for purposes of improving high speed data communication.

A previous interface in this architecture involved the Connection Block (CB) mechanisms whereby these CB methods have basically been replaced by a Connection Library program which is used in the new interface.

In the new Connection Library interface, the port locks are shared between the MCP 80 and the Network Provider 20 (NP) and where a locking convention is adhered to by both the MCP 80 and the Network Provider 20 in order to avoid undesired deadlocks. The locking rules involved here will be described subsequently under the title of "Objects Exported by the MCP Logical I/O."

The architecture has been now arranged that the Network Provider 20 implements the PIE Connection Library in its Support Library. The Master Control Program 80 (MCP) will use the SLed Function Name of a Network Provider's Support Library as the function name for the PIE CL.

The MCP Ports Module 18 is also used to continue to support the prior Connection Block PIM/PIE interface which used the earlier Connection Block technology.

The improved implementation of FIG. 1 now provides methods whereby the Network Provider 20 uses the new Connection Library interface, that is to say, the PIM CLE 18*m*, 20*m* interface and the PIE Connection Library Elements 18*e*, 20*e*. The PIE earlier developed Connection Blocks can also co-exist within the single Network Provider 20. This is to enable support of the sync ports PIE interface which still continues to use the older Connection Blocks (CB) but which may sometimes be required to support some of the older computer systems and networks still in use.

Thus the Network Provider 20 can choose to use either the new Connection Library interface (PIM-CL, PIE-CL) or else fall back upon the priorly used Connection Block Interface. The provider may use both the PIE CB and the PIE CL if it is using a PIM CL. If it is using a PIM CB, it may only use the PIE CB. This allows support for Sync_Ports, which are restricted to using the PIE CB.

Most of the "imported" and the "exported" objects for the new Connection Library (CL) interface have been carried over from the prior operations used in the CB interface. All typed procedures return a REAL result in a Request-Result structure format which was particularly defined in a Unisys Corporation Document 50101 entitled "Network Provider Selection for IPC", designated Version F, May 1994.

During its initialization, the Network Provider 20 (NP) will link its PIM_CL to that of the MCP 80 by invoking a MCP entry point LINK_ME_TO_DO_CL. This will be discussed hereinafter.

LINKING THE PIM CLs: The Process Inter-Communication Manager-Connection Library (PIM_CL) shown in Ports 18 on the MCP side (80 FIG. 3A) is a Multi-Connection Library in a Server role. The PIM_CL 20*m* on the Network Provider side 20 (NP), is a single Connection Library acting as a client. During its initialization, if it is to provide the PIM/PIE CL interface, the Network Provider 20 links its PIM_CL on to a PIM_CL connection of the MCP 80.

Since READYCL (Ready Connection Library) is not available for connection libraries which have been declared at the DO level, then the Network Provider 20 cannot initiate the linkage using the regular Link Library in order to enable connection to PIM_CLs. Here instead a direct linkage mechanism is provided to the Network Provider 20 where there is a particularly indicated MCP entry.

The Network Provider 20 (FIG. 1) will ready its Connection Library interface PIE_CL during its initialization and also the MCP 80 will link a separate queue for each dialog that the Network Selector 9 assigns to the Network Provider 20. A library matching attribute Interface Name for the PIE CL is the PIE name that the Network Provider 20 passes on to the MCP 80 in the Declare_PIE interface.

The PIE CL (Processor Inter-Communication Element-Connection Library) will take over the functions of the earlier used PIE CB (Connection Block) f or the Network Providers that support it. Procedures exported by either side of the PIE CL interface have no ANY FAULT blocks. Instead, each side of the interface will export a procedure to handle fault recovery and cleanup.

Subsequently, herein there will be a discussion of the procedures imported and exported through the PIE CL which procedures will be imported by the MCP 80. The export procedures here involve objects exported by the network providers.

Then, likewise, there are objects exported by the Master Control Programs Logical I/O which are imported by the Network Provider via the PIE interface Connection Library.

In summary, there are system software interfaces for the (A) Process Inter-Communication Element Connection Library (PIE CL) and there are system software interfaces for the (B) Process Inter-Communication Manager Connection Library PIM CL.

In each of these cases (A) and (B), will be seen to have three elements.

Thus the Process Inter-Communication Element Connection Library item A (PIE CL) will provide the following procedures:

A1: Objects exported by Network Providers;
A2: Objects exported by MCP Logical I/O;
A3: Linking PIE_CLs.

Likewise, for item B regarding the Process Inter-Communication Manager Connection Library (PIM CL), there are basically three sets of procedures involved for this Section B as follows:

B1: Objects exported by Network Providers;
B2: Objects exported by the MCP Logical I/O;
B3: Linking the PIM__CLs.

SECTION NDPI

The Network Data Path Interface 30 is one of several system software interfaces used in the present high speed data com system. These interfaces are indicated below.

System Software Interfaces:

(i) The Network Provider (NP) and Network Processor Support (NPS);
(ii) The Network Provider and Physical I/O;
(iii) Physical I/O and the Path Subsystem;
(iv) Network Processor Support and Connection Services;
(v) Connection Services and Network Provider.

As seen in FIG. 6, the Network Data Path Interface 30 provides operations of the interface between the Network Provider 20 and Physical I/O 40.

PURPOSE: The purpose of this interface is to manage the initialization and termination of the input and the output Network Data Paths.

FUNCTIONS: On the "Input Data Path, (FIG. 2)" the Network Provider 20 is responsible for managing input buffer pools and initializing the input pipes. The Network Processor Support 35 (FIG. 7) (when used) is responsible for insuring that the input buffers and the associated events are attached and properly marked as "Read" buffers.

Once the input buffers have been initialized, the Network Provider 20 waits for an input indication from the I/O 40. Network Provider 20 is also responsible for maintaining worker stacks to process input indications from the Physical I/O 40. It is assumed that at least one worker stack per input queue is required. Since the Network Provider 20 may process input on the worker stack, more than one worker stack per input queue may be required.

On the "Output Data Path FIG. 2)", the Network Provider 20 is responsible for creating all output queues and initializing the output buffers. In systems where Network Processor Support 35 is also implemented, the output buffers are initialized via a "Call" to the Network Processor Support 35. The output is then sent directly to the Physical I/O 40.

The basic architecture of the prior developed Network Data Path Interface 30p is shown in FIG. 7 where the Network Provider (20) Protocol Stack is seen to have a buffer pool 20bp whereby one selected buffer such as 20ib is selected for a dialog message. The Network Provider 20 is seen to utilize a Connection Block interface of a Path User Connection Block (CB) 20pu in Network Provider 20 and 35pu in Network Processor Support 35 in order to maintain communication with the Physical I/O 40 (FIG. 7).

SECTION NPSI

NETWORK PROCESSOR SUPPORT INTERFACE (35) FIGS. 3A, 3B

IMPROVEMENTS: In order to provide additional performance improvements, this Network Processor Support Interface 35 will make use of the new Connection Library (CL) mechanism, seen in FIG. 5.

The NP Support 35, when utilized in the present system, can also continue to support the CB (Connection Block) Network Provider Interface for Network Providers which do not use the new Connection Library (CL) Interface as indicated in FIG. 3B. Also, Network Providers can support the prior type of Connection Block Interface 30 in case the system version of the Network Processor Support does not support the new interface.

INITIALIZATION AND TERMINATION: The Connection Library (CL) between any given Network Provider 20 and Network Processor Support 35 (FIG. 3B) contains one Connection Library Element (CLE) per device. All pipes between the given Network Provider and a given device will use the same Connection Library Element (CLE). The pipe "id" is passed on to the Network Processor Support via the Initialize__Pipe instruction.

The CLE is connected to Network Processor Support 35 via the INTERFACENAME attribute in the Link Library. This INTERFACENAME is based on the ICP/CA unit number. For example, INTERFACENAME="NP__ ←UNITNUMBER→.".

NETWORK PROCESSOR SUPPORT APPROVAL PROCEDURE: The Network Processor Support 35 initializes all procedure references based on whether or not the ICP/CA (Integrated Communication Processor/Channel Adapter) supports multiple pipes. This approval procedure is only invoked during initiation of the CLE (Connection Library Element).

NETWORK PROVIDER CHANGE PROCEDURE: The Network Provider's change procedure is used to insure proper termination when the Network Processor Support 35 goes away. The Network Provider is responsible for cleaning all of the "Area 1" buffers attached to the device being terminated. These buffers must then be marked as "free" for use by other devices but cannot actually be used until another Attached__Buffers__and__Events operation is done to associate them with a new device. "Area 1" buffers represent the first buffer in a multi-area I/O.

NETWORK PROCESSOR SUPPORT CHANGE PROCEDURE: The Network Processor Support 35 change procedure is to insure proper termination when the Network Provider 20 goes away. When the change procedure is invoked with a state of "delinked", the Network Processor Support 35 informs the Path Subsystem 54 with ENDP commands on the output queue. This informs the Path Subsystem 54 that there are no more GETs outstanding for the pipes initialized via the Connection Library (CL). The Network Provider 20 will then wait for outstanding I/Os to complete. All outstanding GETs will be completed by returning a "dummy message" as handled in the Path Subsystem-Network Processor Support Interface.

DELINK LIBRARY: The Network Provider 20 performs an explicit Delink Library to initiate termination of the CLE (Connection Library Element). This occurs on the Network Provider termination only. It implies that the Provider 20 will not delink when all connections are clear on a given device and that when a connection is again available on a device, the Library does not have to be re-linked. Both the Network Provider and the Network Processor Support are informed of a delink via appropriate change procedures.

NETWORK DATA PATH INTERFACE FUNCTION: The Connection Block (CB) units (20pu, 35pu, FIG. 7) between the Network Provider 20 and the Network Processor Support 35 provides: (i) initialization of the input pipe; (ii) initialization for the Input/Output data buffers to be used for both Physical I/O Reads and Writes, for both the Gather and the Non-Gather Systems; (iii) termination of data buffers; (iv) I/O error handling and simulation of multiple pipes for systems that do not support them.

NETWORK PROCESSOR SUPPORT INITIALIZE PIPE: This is a procedure which is exported from the Network Processor Support Connection Block 35*pu* (FIG. 7) and is called by the Network Provider 20. This procedure is called by the Network Provider 20, once the Linked Library has completed successfully. It passes the pipe "id" so that the Network Processor Support 35 can send the PIPE command to the Path Subsystem 50 on the ICP/CA (Integrated Communications Processor/Channel Adapter). The Network Processor Support 35 will wait on the I/O and handle the case where an error occurs. The pipe "ids" owned by each Network Provider are static (per DAS 22, FIG. 3A) and are unique to the entire system, that is, they cannot be shared across Providers.

SECTION CSI

There are a number of significant features which are provided by the system's Cooperative Service Interface 12, FIG. 2. These features include the elimination (Seen in FIG. 3A) of a Port I/F (Logical I/O 14) and ports 18 which would normally be required for the DSS's data path. The Network Selector Module 9 need not be used when the Cooperative System Service interface 12 is used. The buffer sharing between the Network Provider 20 and the DSS 10 will be seen to (i) eliminate data copies, and (ii) eliminate call-back procedures. The arrangement for lock-sharing between the Network Provider 20 and the DSS 10 will be seen to (a) simplify the locking procedures, and (b) eliminate the lock-related timing holes. Further, the interface between the DSS 10 and the Network Selector Module 9 (FIG. 3A) also work for enhancement of supporting the Cooperative Interface. The Cooperative Service Interface 12 presents certain advantages over its predecessors which previously involved a synchronized port interface which used Connection Blocks (CBs); and the new Cooperative Service Interface now uses a CL-oriented interface, providing a CL-oriented (Connection Library) interface which allows the elimination of the Logical I/O port, but also now allows buffer sharing.

The Cooperative Service Interface 12 has certain key features of enhancement which involve (i) the locking strategy whereby dialog locks will be shared between the DSS 10 and a Network Provider 20. Further, (ii) the use of buffer-sharing whereby ownership of the Network Provider input buffers is logically transferred to the DSS 10 when the DSS 10 chooses to retain a buffer delivered to the DSS 10. The ownership of the DSS 10's output buffers is logically transferred to the Network Provider 20 for transmission when the output is requested. As a result, much data-copying is eliminated.

The ownership of buffers shared in this way is later returned to their original owner when the borrower is finished with them.

Referring to FIG. 2, there is seen a drawing of the utilization of the Cooperative Services Interface 12 by means of showing two main channels of the data flow, that is to say, the "Output path," and other path being the "Input Path." Here in FIG. 2, there is seen the DSS 10 having an outgoing buffer pool $10_{op}$, a lock pool $10_{Lp}$, and an image of the input buffer pools, $10_{ip}$, which consist of pointers to the actual pool, 20 ip in the Network Provider 20.

In communication with the DSS 10, is the Network Provider 20, which is seen to have an input buffer pool $20_{ip}$, and where there occurs an image $20_{ip}$ of buffer pool $10_{ip}$ (involving pointers of buffer pool $20_{ip}$ from the DSS's perspective). Additionally, the Network Provider 20 has an image lock pool $20_{Lp}$ which receives pointers from the actual lock pools $10_{Lp}$, and via a Connection Library element, 11c, from the lock pool $10_{Lp}$.

The Network Provider 20 will be seen to have a set of buffer pool image pointers designated $20_{op}$, which are received from the buffer pool $10_{op}$. Likewise, an Issue Buffer Send Command is sent to the header pool $20_{hp}$ to build the protocol header in $20_{hp}$.

In the Network Provider 20, there are other paths for carrying messages from other DSSs as seen on bus 22m, and further, there is a connection 21n for inserting headers and buffer information in an IOM queue of the Physical I/O 40.

The Physical I/O 40 is a function of the Master Control Program 80 (MCP), where it is seen that "outgoing" messages are placed on the message queue $46_o$, then transferred to the I/O storage unit 47 in order to build a header 48h, and the Write buffers 48, which are sent on bus 50b to the output unit 50o. The single output message-queues 46o in FIG. 2 is in contrast to the multiple queues and 46i which are multiple in number and constitute 16 input queues designated via dotted lines shown as 46i-16.

Similarly, the Physical I/O 40 will be seen to have an "input" Read Request block 42, which is connected to the unit 43 in order to store messages onto the message queues 46i and also to send information (Message Complete) on bus 45 to the buffer pools 20ip, and specifically for example, to a selected buffer 20ib.

Data flows are shared according to the lines headed by arrows shown in FIG. 2. The buffer pool $10_{op}$ in FIG. 2, is the output buffer pool which is owned by the DSS 10 (shown in solid lines), and is exported to the Network Provider 20 where its imported image of pointers is shown as an image buffer pool (holding pointers) $20_{op}$.

Similarly, there is shown the owners and imported images of other shared data items, such as the dialog lock pool $10_{Lp}$ owned by the DSS 10, which is exported to the Network Provider 20. The "input buffer" pool $20_{ip}$ owned by the Network Provider 20 is exported to the DSS 10, where it is consumed by the DSS which writes it to disk if it is transferring a file. The DSS 10 also can put the information in a mail box if it is receiving mail.

One output unit message queue 46o is shown accepting output messages from "other" DSS's on bus 22m.

As seen in FIG. 2, the input path may operate into a single Channel Adapter of a Network Processor 50 having a single receiving unit $50_i$, which feeds input data into the Read Request buffer 42, which is fed to the receiving unit queue 43 and then to message queue $46_i$. When the buffer pools, $20_{ip}$, of Network Provider 20 issue the buffer Read command to the input message queue $46_i$, then the unit 43 will transmit to the buffer pool $20_{ip}$, and thence to the image buffer pools and pointers $10_{ip}$ of the DSS 10.

The interfaces between the DSS 10 (or other DSS's), and the Network Provider 20 is basically indicated in FIG. 2. These can be designated as system software interfaces.

The purpose of these system software interfaces is to manage the initialization and termination of dialogs between the DSSs 10 and remote end points, and the flow of input and output data over these dialogs.

The functions of these system software interfaces involve (a) initialization and termination, (b) utilization of the input data path, and (c) utilization of the output data path.

The Network Provider 20 is responsible for validating attributes from the DSS 10, and if no error is detected, the "Open Sequence" is initiated. The "Open Sequence" is a protocol-dependent exchange of messages which establishes a dialog. The Network Provider 20 notifies the DSS 10 when the "Open Sequence" has been completed, and when the remote side has initiated or completed termination. The Network Provider 20 must continue to handle both passive and active "opens", and the orderly and immediate "closes" (close abort).

On the "Input" path interface of FIG. 2, the Network Provider 20 is responsible for passing received data in buffer 20ib to the DSS 10 via image buffer pool 10ip and providing the DSS the opportunity to retain the data for subsequent retrieval. If the DSS retains the data, the DSS 10 is then considered to be the "owner" of a buffer such as 20ib, and is responsible for notifying the Network Provider 20 when the buffer 20ib is available for re-use.

On the "Output" data path interface (FIG. 2), the Network Provider 20 is responsible for forwarding the DSS's buffer's data, passed via the image buffer pool 20op and header pool section 20hb to the Network Provider by the DSS 10, over to the physical I/O 40, after attaching the appropriate headers. The Network Provider 20 is also responsible for notifying the DSS 10 when the buffer's data becomes available. Further, the Network Provider 20 is responsible for notifying the DSS 10 when outbound flow control is entered and is exited.

In regard to FIG. 2 in earlier implementations, a DSS would use the buffer pool $10_{op}$, and the DSS would indicate that it needs to send a message to the service on another machine, so that the DSS would call the Network Provider 20. Then the Network Provider 20 would copy the data again, and the Network Provider 20 would now have its own copy of the data from the buffer pool $10_{op}$. Then the Network Provider 20 would send the data down to be copied by the Physical I/O 40 through the queue $46_o$, and the data would get copied into the memory of the Channel Adapter 50 (FIG. 2).

Now in the present system, the DSS 10 builds the data directly into the buffer pool loop. However, since the system is now sharing the references to this buffer pool $10_{op}$, it is not necessary to copy it over to the Network Provider 20. What happens here is that the Network Provider 20 builds a header in header pool $20_{hp}$, which will be useful for sending or transmitting the data in $10_{op}$ to the DSS 10 or another machine. The Network Provider 20 then uses the image pool 20op of the buffer pool $10_{op}$ (which involves a selection of pointers) to enable message transfer.

Under the earlier methodology, the User would have some data, and would call the DSS 10 to send the data to a buffer pool in the Network Provider 20, plus a header pool to describe what was going to happen to the data. Then the User would say he needs to send that information and would call the Network Provider 20, which would operate to say "I put my own header material on the front, and then behind this I have the messages from the DSS 10, and I will pass this down another level to the Physical I/O 40 to be sent to the Channel Adapter." Thus, what was done was to copy the User data into the DSS buffer, and then "again copy" the User data and the DSS data into the Network Provider buffer, (in the Network Provider 20). Then the entire message data and header package would be sent out to the I/O 40 and the Channel Adapter of the Network Processor 50.

Quite contrarily, under the presently described system, the real buffer $10_{op}$, of the DSS 10 is then placed as an image pointer in the Network Provider 20. This image is merely just a reference into the memory of the DSS 10.

So what is done is to copy the User's data into the DSS's buffer $10_{op}$, and still put the DSS's header on the front of it, but now, under the present system, it is not necessary to copy this data into the Network Provider 20. The image buffer pointer pool 20op of the Network Provider 20 is not a copy of the data, but is merely a reference unit using pointers, which involves functions similar to that of a pointer looking into another person's memory. So a considerable savings is initiated since it is much faster, in that it is not necessary to "copy" the data, but merely to set up a reference pointer to a memory.

What is still utilized here, is the Network Provider's header pool $20_{hp}$, and then using the "Gather" operation where it is possible to concentrate and pass the two buffers ($10_{db}$ and $20_{hp}$) collectively, i.e. first one, and then the second, on just one request, so no data was necessary to be copied. So now the present operation copies the data out of the User's buffer, but is not required to copy the DSS's data, or copy the DSS's copy of the User's data.

This data still sits in a section of memory and it gets sent out on the wire, and when the "send" is finished, it tells the DSS 10 that the transmission was completed.

The data in memory remains in the DSS buffer pool $10_{op}$, so that there is the concept of "buffer sharing" which is operating in the outward path direction. Likewise, this is also done in the inward, or input path direction.

Thus, the module which owns the buffer, for example, the Network Provider owning the buffer pool $20_{ip}$, passes the reference pointers to $10_{ip}$ of the DSS 10 and it does not have to copy the data and pass it on.

So rather than copying, for example, on the input path channel, it is only necessary to get in the "message" which has three parts to it; (i) the Network Provider portion 20 on the front, then (ii) the DSS 10 part in the middle, and then (iii) the "User" part on the end. Thus, rather than copying (which formerly had to be done), it is just now necessary to copy this particular part into the buffer $20_{ip}$, which would then be copied into the User's Buffer by utilization of the image pointers or buffer pools $10_{ip}$. These pointers are a view pointing to the memory, so that the DSS 10 has a view of the memory that belongs to the Network Provider 20.

Then the Network Provider 20 sends the pointers which access the memory for transmission to the User buffer.

What is actually being done is to tell the DSS 10 where the dialog information is located in the buffer, $20_{ip}$ of the Network Provider 20.

The Cooperative Service Interface 12 involves a series of line interactions. It involves the "projection" of the two buffer pools $10_{op}$ and $20_{ip}$ from one environment into the other, using a set of pointers which are in the interface, these image pointers being $20_{op}$ and $10_{ip}$.

It may be noted there is a similar set of image pointers for the lock pool $20_{Lp}$ which operates for coordination to make sure that two requesters are not trying to access the same memory location at the same time.

The Cooperative Service Interface 12 provides an additional performance over the earlier types of Sync_Ports by allowing a Network Provider and a DSS to bypass the Port File code in the Master Control Program (MCP), by allowing it to share data and by relaxing the rules about what can be performed as part of an input notification.

SECTION G

Figure 4:
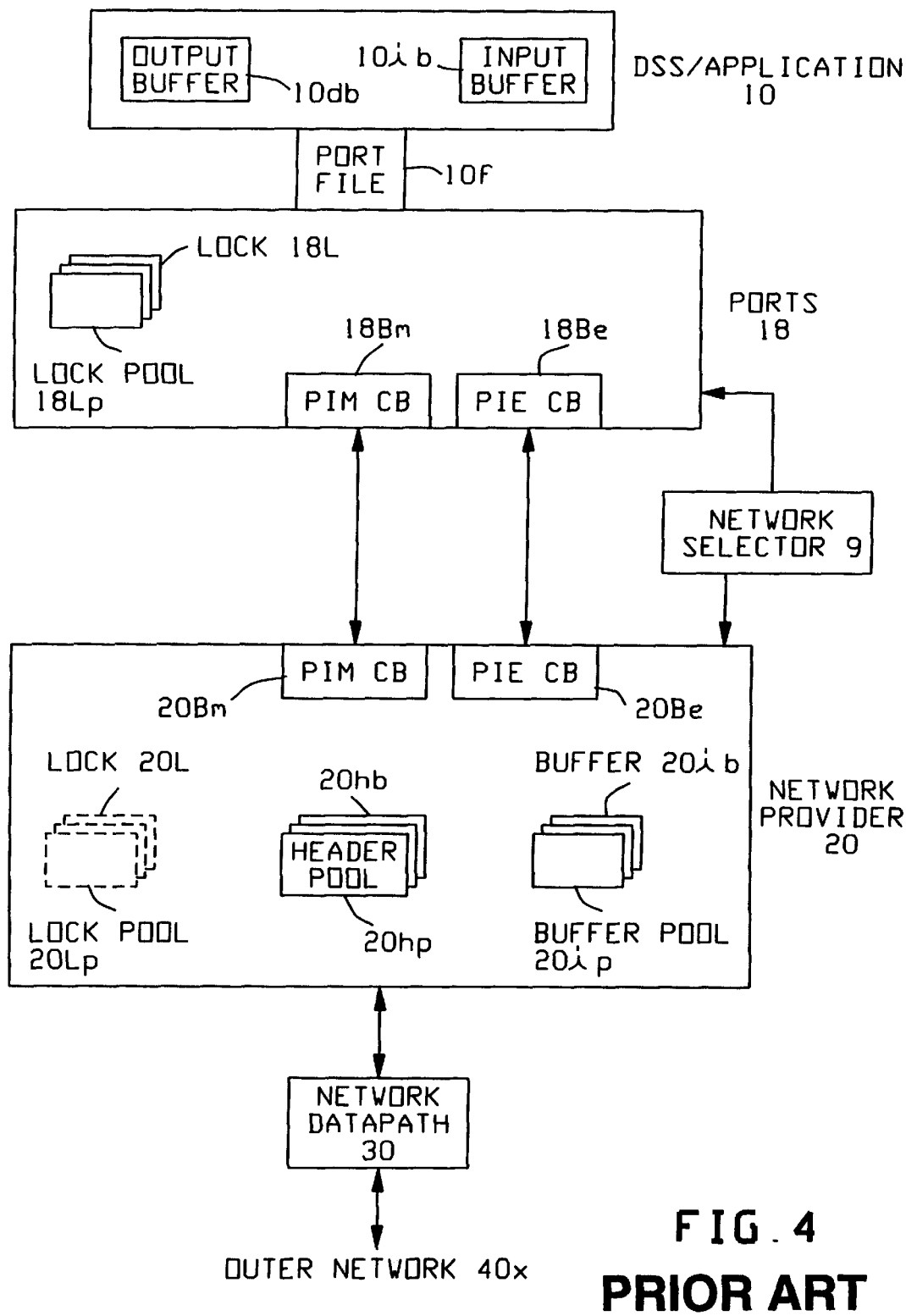
FIG. 4 is a drawing of an earlier Networking Data Path Interface architecture which involved Connection Blocks (CB) 18B, 20B, which were burdened with high overhead, undesired latencies and multiple lock pools.

The interface between the MCP's Port File code and the Network Providers was previously implemented as an old-style Connection Block (CB), such as seen in FIG. 4. By changing this implementation to a Connection Library (CL), as in FIG. 5, this provided a performance advantage by eliminating the MCP overhead required to access entry points exported via a Connection Block (CB). Because Connection Libraries can export data items in addition to procedures, this change also allows for Port File code and the Network Providers to "share" dialog-oriented locks. Such sharing allows elimination of the elaborate lock-deadlock avoidance code previously employed and is now permitted to be simplified greatly, thereby not only improving performance, but also closing numerous timing windows. Sharing locks this way also obviates the need for several of the more complex interfaces previously required.

The E-mode-based portions of Network Providers currently communicate with their Network Processor components via an interface provided by Network Processor Support 35. The Network Processor Support 35 was used in earlier implementations to provide (FIG. 7) a complex path CB (Connection Block) interface which Network Providers use to get the data they wish to send into a I/O capable buffer, and the Network Processor Support 35 generates and parses the Queue Service Provider (QSP) protocol in order to multiplex the numerous dialogs the Network Providers have, over a single physical unit queue.

In the improved architecture, multiple queues are provided between the E-mode environment, and a given Channel Adapter environment, obviating the need for the earlier multiplexing function, and eliminating the de-multiplexing bottleneck on the NP/Controller stack on the input. Since the QSP protocol generation is very simple, that function has been moved into the Network Providers. This redistribution of function allows the NP Support 35 to be eliminated from the data path.

To avoid the necessity of copying data in order to assemble Network Provider-generated header data, and data from multiple-user buffers into one contiguous memory area, the ability to Gather data from multiple buffers on output is added to the I/O processor in the I/O 40. The physical I/O simulates Gather in cases where the I/O processor does not support it directly.

In addition, a Scatter feature is provided, so that a single incoming data message can be split across multiple buffers. This is used by the Network Providers to ease their memory management problems; they have consolation code to cope with cases where Scatter is not provided by the I/O processor.

DATA AND STATE SHARING: The buffer pool $10op$ shown in FIG. 2 is the output buffer pool which is owned by the DSS 10, and is exported to the Network Provider 20 where its imported image is shown with the dashed lines as $20_{op}$, which holds pointers.

Similarly, the same solid and dashed lines are used to show the "owners" and the imported images of other shared data items. The dialog lock pool $10_{Lp}$ is owned by the DSS 10. Image Buffer Pool $10_{ip}$ is for holding pointers to be exported to the Network Provider 20. Likewise in FIG. 2, the input buffer pool $20_{ip}$, which is owned by the Network Provider 20, is exported to the DSS 10 to Image Buffer Pool $10_{ip}$.

One output unit queue is shown accepting output messages from other DSS's on line $22m$. The diagram in FIG. 2 shows multiple input unit queues $46i$-16. In actual implementation, there can be multiple independent input unit queues, up to 16 for example.

The purpose of the Cooperative Service Interface 12 is to manage the initialization and termination of dialogs between DSS's and remote end points, and to manage the flow of input and output data over those dialogs.

INITIALIZATION AND TERMINATION: The Network Provider 20 is responsible for validating attributes from the DSS 10, and if no error is detected, an "Open Sequence" is initiated. The Network Provider 20 notifies the DSS 10 when the Open Sequence has completed, and also when the remote side has initiated or completed termination. Network Providers must continue to handle both passive and active "opens", and orderly and immediate "closes."

INPUT DATA PATH: On the input data path of FIG. 2, the Network Provider 20 is responsible for passing received data to the DSS 10 and providing the DSS the opportunity to "retain" the data for subsequent retrieval. If the DSS retains the data, the DSS 10 is then considered to the "owner" of that buffer, (such as $20_{ib}$) and is responsible for notifying the Network Provider when that buffer is available for re-use (de-allocation).

OUTPUT DATA PATH: On the output path of FIG. 2, the Network Provider 20 is responsible for forwarding the buffers passed to it by the DSS 10 over to the Physical I/O 40 after attaching the appropriate headers from the header pool $20hp$. The Network Provider 20 is also responsible for notifying the DSS 10 when buffers become available. Additionally, the Network Provider 20 is responsible for notifying the DSS 10 when outbound flow control is entered and exited.

ARCHITECTURE: In order to provide additional performance requirements, the Cooperative Service Interface 12 will make use of the Connection Library mechanism, shown in FIGS. 2 and 5. Linkage is initiated by the DSS 10. This interface will not be operative before a Network Provider 20 has been established with Network Provider Support 35, and may be terminated unexpectedly if the NP Support changes versions while the Network Provider 20 is running. A single Connection Library may support multiple dialogs. Thus in FIG. 5, the DSS 10 has a Connection Library $10_c$ and the Network Provider 20 has a Connection Library $20_c$.

SECTION CLD

DSS CONNECTION LIBRARY DATA ITEMS: These data items are exported by the DSS Connection Library (CL) $10_c$, FIG. 5, and imported by Network Provider Connection Library (CL) $20_c$, FIG. 2 and 5.

The buffer pool $10_{op}$ in FIG. 2 is used for DSS-initiated outbound data requests. A reference to the same buffer may be passed on to the Network Provider 20 for more than one dialog at a time. It may also be passed to more than one Network Provider at a time. As such, the Network Provider 20 may not write into the buffer. If this kind of sharing across dialogs and Network Providers is done, the DSS 10 must ensure that the "same lock" is used for all dialogs to which the buffer reference may be passed. This for example, in FIG. 2, could be a lock such as item $10_{dL}$.

In FIG. 2, the shared lock pool is designated $10_{Lp}$ and is used for guarding the "state" related to dialogs implemented over this instance of the Cooperative Service Interface 12. When calling imported Network Provider procedures, the DSS will be "holding" the shared dialog lock. The Network Provider 20 may not release the lock before returning from the call. When the Network Provider 20 calls one of the exported DSS procedures, it must do so while holding the dialog lock. The DSS 10 may not release the lock before returning from the call.

To avoid deadlocks, both the DSS 10 and the Network Provider 20 must enforce consistent lock-ordering rules regarding locks which are held at the same time as the dialog lock. In addition, if either entity needs to hold two or more dialog locks simultaneously, it must grab the one with the lowest lock number first.

NETWORK PROVIDER CONNECTION LIBRARY DATA ITEMS: In FIG. 5, these are the data items which are exported by the Network Provider Connection Library $20_c$, and which are imported by the DSS Connection Library $10_c$.

In FIG. 2, the buffer pool $20_{ip}$ is the buffer pool which contains inbound requests. The DSS 10 may not Write into the Network Provider's buffer pool $20_{ip}$.

INITIALIZATION, TERMINATION, OTHER ADMINISTRATION INTERFACE ITEMS: The Connection Library $10_c$ of FIG. 5 between the Network Provider 20 and the DSS 10 provides support for dialog initiation and for termination for the DSS 10. It also provides a mechanism whereby the DSS 10 and the Network Provider 20 can exchange information global to all dialogs associated with this connection library, such as the IDs of the buffer pools that will be used for input and output.

There is no automatic mechanism for returning buffers to their declarers. This must be done by the DSS 10 and the Network Provider 20. It is the responsibility of the DSS 10 to return all Network Provider buffers retained by the DSS. Similarly, it is the responsibility of the Network Provider 20 to return all DSS buffers passed to the Network Provider for transmission over the network. Buffers are to be returned as soon as convenient, but there is no requirement that buffers be returned before the dialog, that they are associated with, terminates.

MAIN FUNCTIONS: INPUT PATH FOR NETWORK DATA PATH INTERFACE 30: The following functions are provided in the interfaces on the "Input Data Path": (FIGS. 7, 3B).

(if1) CA/ICP 50 to Network Processor Support 35:

(Channel Adapter/Integrated Communications Processor-Network Provider Support).

(a) Support of multiple pipes.

(b) Simulation of multiple pipes on systems which do not support multiple pipes.

(if2) Network Provider 20 to Physical I/O 40:

(a) Network Provider waits for input from Physical I/O.

(if3) NETWORK PROCESSOR Support 35 to Network Provider 20:

(a) Initializes and terminates input pipes/queues.

(b) Network Provider manages input buffer pools.

(c) Network Provider initializes buffers via NETWORK PROCESSOR Support.

OUTPUT DATA PATH FUNCTIONALITY FOR NETWORK DATA PATH 30 (FIGS. 3B):

(of 1) NETWORK PROCESSOR Support 35 to CA/ICP, 50:

(a) Support of Gather.

(b) Simulation of Gather on systems which do not support Gather.

(of2) Network Provider 20 to NETWORK PROCESSOR Support, 35:

(a) Network Provider initiates output request to Physical I/O.

(b) Physical I/O returns exception result to the Network Provider.

SECTION PNDP

Now referring to FIG. 7, there is shown a diagram of the prior earlier-used Network Data Path implementation with Connection Blocks. These interfaces required considerable extra overhead and undesirable latencies in operations.

The prior Connection Block Network Data Path architecture of FIG. 7 shows the Network Data Path Interface 30 having a Network Provider 20 with a buffer pool 20bp which utilizes a selected buffer 20ib for a particular dialog message. This message can be input or output via the Path User Connection Block (CB) 20pu, which communicates with the Connection Block 35pu of the Network Provider Support 35.

The Network Processor Support 35 provides an output buffer pool 35op which has a selected buffer 35ob for a particular dialog message. The input buffer pool 35ip utilizes a selected buffer 35ib for particular input dialog message data. A file 35f designated as EIO file communicates with the I/O 40 having an Output Message Queue 46oq and Input Message Queue 46iq.

I/O Hardware 45 transports data between I/O 40 and the Path Subsystem 54 of Network Processor 50 which can include ICPs (Integrated Communications Processors), Channel Adapters or other peripheral modules as seen in FIG. 3B where the Network Processor 50 shows the ICP environment.

The following sections designated "Section PCB" and "Section PCL" will illustrate the sequential operational functions and difference between the prior PIM/PIE Connection Block Interface (Section PCB) and the improved PIM/PIE Connection Library Interface (Section PCL).

SECTION PCB: PRIOR IMPLEMENTATION

Prior PIM/PIE CB interface; Functional Elements: (Refer to FIG. 4):

PCB 1. Dialog Setup initiation

PCB 2. Dialog Setup completion

PCB 3. Sending Data

PCB 4. Resending Data

PCB 5. Receiving Data

PCB 6. Delayed processing of data

PCB 1: Dialog Setup—Initiation (FIG. 4)

1. Application initiates "Open" action, calls Ports 18, via file 10f in DSS 10.

2. Ports 18 allocates a lock 18L from lock pool 18Lp, to use to protect the dialog state.

3. Ports grabs its dialog lock 18L.

4. Network Selector 9 determines which Network Provider to use.

5. Ports 18 drops it dialog lock 18L.

6. Ports calls the Network Provider 20 via PIM CB 10Bm and asks it to establish a dialog.

7. Network Provider 20 allocates a lock 20L from lock pool 20L for its side of the dialog and allocates a dialog state.

8. Network Provider 20 grabs its lock 20L.

9. Network Provider 20 validates the request.

10. Network Provider 20 takes protocol-specific action to begin dialog initiation. (This involves sending data out on the network via the underlying interface 40x).

11. Network Provider drops its lock 20L.

12. Network Provider returns to Ports 18.

13. Ports 18 grabs its dialog lock 18L.

14. Ports adjusts its state information.

15. Ports 18 drops lock 18L.

16. Ports waits to be notified that dialog has been initiated.

PCB 2: Dialog Setup—Completion

1. Network Provider 20 receives input data from the network 40x.

2. Network Provider looks at data and decides which dialog it is related to.

3. Network Provider grabs lock 20L.

4. From data, Network Provider determines that it has completed its protocol sequence and the dialog is established.

5. Network Provider 20 completes its dialog table.

6. Network Provider calls Ports 18 via PIM CB 20Bm to inform it.

7. Ports 18 grabs lock 18L.

8. Ports links the PIE CB 18Be to the Network Provider 20.

9. Ports 18 updates its dialog state.

10. Ports signals user that dialog is now Open.
11. Ports 18 drops its lock 18L.
12. Ports returns to Network Provider 20.
13. Network Provider drops its lock 20L.

PCB 3: Sending Data

1. Application 10 fills a buffer 10*db* with a message it wants to send.
2. Application calls WRITE referencing the file 10*f* and the output buffer 10*db*.
3. Ports 18 grabs its dialog lock 18L.
4. Ports verifies that dialog state allows sending.
5. Ports drops its lock 18L.
6. Ports 18 calls Network Provider 20 via PIE CB 18*e*.
7. Network Provider 20 grabs its lock 20L.
8. Network Provider allocates a buffer 20*ib* from buffer pool 20*ip*.
9. Network Provider 20 builds a protocol header 20*hb* in the front of the buffer 20*ib*.
10. Network Provider copies the Application's data from the Application's buffer 10*db* into the Network Provider's buffer 20*ib* (after the header).
11. Network Provider calls underlying interface to send the data out on the network, via 40*x*.
12. Network Provider drops its lock 20L.
13. Network Provider returns to Ports 18.
14. Ports grabs its lock 18L.
15. Ports adjusts its state information.
16. Ports drops its lock 18L.
17. Ports returns to Application 10.
18. Application 10 may now reuse its buffer 10*db*.

PCB 4: Resending Data

1. Network Provider 20 determines that data has not arrived at its remote destination.
2. Network Provider grabs the dialog lock via 20L.
3. Network Provider reuses buffer 20*ib* built in the sending data step to send the data over the network another time.
4. Network Provider 20 drops its dialog lock.

PCB 5: Receiving Data

1. Network Provider 20 receives data from network 40*x* via underlying interface.
2. Network Provider determines which dialog the data belongs to.
3. Network Provider grabs the dialog lock 20L.
4. Network Provider adjusts to its dialog state.
5. Network Provider 20 calls in Ports 18 via PIE_CB 20B*e*.
6. Ports grabs its lock 18L.
7. Ports saves a reference to the data for later processing.
8. Ports adjusts its dialog state.
9. Ports signals the user that data is available.
10. Ports drops its lock 18L.
11. Ports returns to Network Provider 20.
12. Network Provider 20 drops the lock 20L.

PCB 6: Delayed Processing of Data

1. Application 10 calls READ via the Port File 10*f* referencing an application buffer 10*ib*.
2. Ports 18 grabs its lock 18L.
3. Ports 18 validates that dialog is active.
4. Ports drops its lock 18L.
5. Ports calls in Network Provider 20 via PIE_CB 20B*e*.
6. Network Provider grabs its lock 20L.
7. Network Provider 20 locates the data the application is requesting and copies it into the application's buffer 10*ib* in DSS/Application 10.
8. Network Provider drops its lock 20L.
9. Network Provider 20 returns to Ports 18.
10. Ports grabs its lock 18L.
11. Ports adjusts its dialog state.
12. Ports 18 drops its lock 18L.
13. Ports returns to the Application 10.
14. The Application 10 processes the data.

SECTION PCL (FIG. 1)

New PIM/PIE CL interface; Functional Elements:

PCL 1. Dialog Setup initiation
PCL 2. Dialog Setup completion
PCL 3. Sending Data
PCL 4. Resending Data
PCL 5. Receiving Data
PCL 6. Delayed processing of data PCL 1: Dialog Setup—Initiation (FIG. 1)

1. Application initiates "Open" action, calls Ports 18 via file 14 in DSS 10.
2. Ports 18 allocates a lock 20L from lock pool 20L*p*, in Network Provider 20, to use to protect the dialog state.
3. Ports grabs its dialog lock 20L.
4. Network Selector determines which Network Provider to use.
5. Ports 18 calls the Network Provider 20 via PIM CLE, 20*m* and asks it to establish a dialog and to associate lock 20L with this dialog.
6. Network Provider 20 allocates a dialog state.
7. Network Provider validates the request.
8. Network Provider takes protocol-specific action to begin dialog initiation. (This involves sending data out on the network via the underlying interface 40*x*).
9. Network provider returns to Ports 18.
10. Ports 18 drops lock 20L.
11. Ports waits to be notified that dialog has been initiated.

PCL 2: Dialog Setup—Completion

1. Network Provider 20 receives input data from the network.
2. Network Provider looks at data and decides which dialog it is related to.
3. Network Provider grabs lock 18L in Ports via its reference 20L in NETWORK PROCESSOR 20.
4. From data, Network Provider determines that it has completed its protocol sequence and the dialog is established.
5. Network Provider completes its dialog state.
6. Network Provider calls Ports 18 via PIM CLE 20*m* to inform it.
7. Ports links the PIE CLE 18*e* to the Network Provider's PIE CLE 20*e*.
8. Ports updates its dialog state.
9. Ports signals user that dialog is now Open.
10. Ports returns to Network Provider 20.
11. Network Provider drops the lock via reference 20L.

PCL 3: Sending Data

1. Application 10 fills a buffer 10db with a message it wants to send.
2. Application calls WRITE referencing the file 14 and the buffer 10db.
3. Ports 18 grabs its dialog lock 18L.
4. Ports verifies that dialog state allows sending.
5. Ports calls Network Provider via PIE CLE 20e.
6. Network Provider allocates a buffer 20ib from buffer pool 20ip.
7. Network Provider builds a protocol header in the front of the buffer 20ib.
8. Network provider copies the Application's data from the Application's buffer 10db into the Network Provider's buffer 20ib (after the header).
9. Network Provider calls underlying interface to send the data out on the network.
10. Network Provider returns to Ports 18.
11. Ports adjusts its state information.
12. Ports drops its lock 18L.
13. Ports returns to Application 10.
14. Application may now reuse its buffer 10db.

PCL 4: Resending Data
1. Network Provider 20 determines that data has not arrived at its remote destination.
2. Network Provider grabs the dialog lock via reference 20L.
3. Network Provider reuses buffer 20ib built in the sending data step to send the data over the network another time.
4. Network Provider drops the dialog lock via reference 20L.

PCL 5: Receiving Data
1. Network Provider 20 receives data from network via underlying interface 40x.
2. Network Provider determines which dialog the data belongs to.
3. Network Provider grabs the dialog lock 18L via its reference 20L.
4. Network Provider adjusts to its dialog state.
5. Network Provider 20 calls in Ports 18 via PIE_CLE 20e.
6. Ports saves a reference to the data for later processing.
7. Ports 18 signals the Application 10 that the data is available.
8. Ports adjusts its dialog state.
9. Ports 18 returns to Network Provider 20.
10. Network Provider 20 drops the lock 18L.

PCL 6: Delayed Processing of Data
1. Application 10 calls READ via the Port File 14 referencing an application buffer 10ib in DSS 10.
2. Ports 18 grabs its lock 18L.
3. Ports 18 validates that dialog is active.
4. Ports calls in Network Provider 20 via PIE_CLE 20e.
5. Network Provider 20 locates the data the application is requesting and copies it into the application's buffer 10ib in DSS 10.
6. Network Provider 20 returns to Ports 18.
7. Ports adjusts its dialog state.
8. Ports drops its lock 18L.
9. Ports returns to the Application 10.
10. The Application 10 processes the data.

Disclosed herein has been an improved interface between the MCP Ports unit and a Network Provider which introduces Connection Library Interface Elements between the MCP's Port unit and the Network Provider which enables more efficient methods of data transfer between a Distributed System Service/Application unit and Network Provider for instituting faster data transmission to and from external interfaces.

Attached herein is an Appendix I having sections I-A, I-B and I-C which indicate special procedures involved in the new PIM/PIE CL Interface as follows:
I-A: Port Locks.
I-B: Linking the PIM_CLs: MCP Entry Point.
I-C: Declare PIE.

Although a preferred implementation of the invention has been described herein, it should be understood that the invention is defined in the claims appended hereto:

APPENDIX I-A

PORT LOCKS: The MCP exports this data structure to the Network Processor to support the new lock sharing scheme between the MCP and the Network Provider. The port_lock_index parameter passed to the Network Processor procedures Initiate_Dialog and Request_Dialog_Evaluation is used to index into this Port_Locks array in order to obtain the interlock used for the dialog.

ALGOL Declaration:
INTERLOCK ARRAY REFERENCE PORT_LOCKS [0];

The locking rules for the new shared lock paradigm are as follows:

1) When calling PIM/PIE CL procedures imported from the Network Provider, the MCP Logical I/O will not drop the shared port lock, and the Network Provider must NEVER relinquish it either before returning from the call.

2) When the Network Provider calls one of the PIM CL procedures exported by Logical I/O it must do so holding the required port lock(s).

3) If the Network Provider needs to hold more than one port lock simultaneously, it must grab them in numerical order (lower lock numbers before higher lock numbers.)

4) To avoid deadlocks, both the MCP and the Network Provider mush enforce consistent lock ordering rules regarding locks which are held at the same time as the port lock.

5) The shared port lock must be held while the PIE CL is being linked and delinked. However, it is not possible to guarantee this for abnormal (blockexit generated) delinks. Therefore, CHANGE procedures which take actions that require holding the locks must check to see if they have the lock and, if not, grab and drop it themselves.

APPENDIX I-B

LINKING THE PIM CLs: The PIM_CL on the MCP side is multi-connection library in a server role, and the PIM_CL on the NETWORK PROCESSOR side is a single Connection Library acting as a client. During its initialization, if it is to provide the PIM/PIE CL interface, the Network Provider will link its PIM_CL to a PIM_CL connection of the MCP. Since READYCL is not available for Connection Libraries declared at DO level, the NETWORK PROCESSOR cannot initiate the linkage using the regular LINKLIBRARY to connect the PIM_CLs. Instead, a direct linkage mechanism is provided to the Network Provider with the following MCP entry point:

ALGOL Declaration:

```
    INTEGER PROCEDURE Link_Me_To_D0_CL
                        (My_CL_Ref
                        , D0_CL_Type
                        ,params
                        );
        VALUE        D0_CL-Type
                     ,params;
        CONNECTION   My_CL-Ref;
        INTEGER      D0_CL_Type;
        REAL         params;
```

Parameters:

| | |
|---|---|
| My_CL_Ref | The CL declared by the Network Provider.<br>D0_CL_TypeIndicates the MCP's D0 CL to be linked to:<br>  1  PIM_CL<br>Other values are reserved for future use. |

Results:

The return value has the same meaning as that from the regular LINKLIBRARY.

APPENDIX I-C

DECLARE PIE: A PIM invokes this procedure when it wishes to describe a PIE to the IPC Interface Manager.

ALGOL Declaration:

```
    REAL PROCEDURE DECLARE_PIE(
                        PIE_NAME
                        ,PIM_ATTRIBUTE_LIST
                        ,PIE ATTRIBUTE_LIST
                        ,PIE_PARAMS
                        ,PIE_ID
                        );
        VALUE        PIE_PARAMS;
        POINTER      PIE_NAME;
        REAL ARRAY   PIM_ATTRIBUTE_LIST [0]
                     ,PIE_ATTRIBUTE_LIST [0];
        REAL         PIE_PARAMS
        INTEGER      PIE_ID;
```

Parameters:

| | |
|---|---|
| PIE-Name | The name used in connecting to the PIE. To avoid duplication of names it is suggested that this name contain a unique PIM name as well as a name which differentiates among the PIEs used by the PIM. If the declared PIE is using the CB interface, the MCP will pass this name to the Network Provider (via the ICM access routine ProvideRequest) for validation when a PIE CB is connected. If the declared PIE CB is using the CL interface, the MCP will use this name as the INTERFACENAME when it links its PIE CL to that of the Network Provider. |
| PIM-Attribute-List | A mask indicating the attributes for which the PIM performs validation (via PIM_ VALIDATE_ATTRIBUTE) hen the dialog is assigned to a PIE. |
| PIE-Attribute-List | A mask indicating the attributes for which the PIE performs validation (via PIE_VALIDATE_ATTRIBUTE) when the dialog is assigned to a PIE. |
| PIE-Parameters | |
| [47:16] | (unused) |
| {31:16] | Attribute-List-Length<br>The Attribute-Id of the highest numbered attribute represented in the Attribute-List parameters. |
| [15:08] | PIE-Name-Length<br>The length of PIE-Name in bytes. |
| [07:08] | PIE-CB-Type<br>The type of CB that Logical I/O should build and connect for dialogs using this PIE. If the declared PIE uses the CB interface the following types may be specified [4]:<br>1  Vanilla_PIE_CB<br>2  Strawberry_PIE-CB<br>3  Chocolate_PIE_CB<br>This document proposed a Type 4 to be added to indicate that the declared PIE uses the CL interface.<br>4 Apple_PIE-CL |
| PIE-Id | The identifier assigned to the PIE by the IPC Interface Manager. (Returned) |

Results:
  OK
  Invalid-PIM-Index
  Provider-Not_Active
  Unsup-PIE-CB-Type
  Duplicate-PIE-Name
  Unsup-Name-Length
  Mask-Overlap

What is claimed is:

1. In a high speed data communication system wherein a Distributed System Service/Application unit (DSS 10) communicates with a Master Control Program (MCP 80) of an associated computer system for enabling communication through a Network Provider (20) to an external network by utilization of a Connection Library means (10c–20c) having Process Intercommunication Elements (10e–20e), a method for enhancing data transfer operations comprising the steps of:

(a) initiating, by said DSS (10), the setting up of a dialog between said MCP (80) having Ports (18) utilizing said Connection Library means, and a selected Network Provider (20);

(b) establishing a selected dialog with a selected Network Provider;

(c) transmitting data, via said Connection Library means (10c–20c), from said DSS (10) via said Network Provider (20) to an external network.

2. The method of claim 1 wherein step (a) includes the steps of:
- (a1) allocating, by said Ports (18), of a lock (20L) in said Network Provider via its reference lock (18L) to hold the selected dialog state;
- (a2) selecting which particular Network Provider (20x) is to be utilized;
- (a3) communicating, by Ports (18), to said selected Network Provider (20x), via a Process Inter-Communication Manager Program, to associate lock (20L) with the selected dialog;
- (a4) notifying Ports (18) that the selected dialog has been initiated.

3. The method of claim 2 wherein step (b) includes the steps of:
- (b1) receiving, by said selected Network Provider (20x), of input data from said external network to determine which dialog the input data is related to;
- (b2) grabbing, by said Network Provider (20), a lock (18L) in Ports (18) via reference from said Network Provider's lock pool (20L);
- (b3) recognizing, by said Network Provider, that the selected dialog has been established;
- (b4) linking, by Ports (18), the Port's Process Intercommunication Element-Connection Library (10e) to the Network Provider's Process Intercommunication Element—Connection Library Element (20e);
(b) indicating, by Ports (18), to a requesting User that the dialog is now open for data transfer.

4. The method of claim 3 wherein step (c) includes the steps of:
- (c1) filling, by said DSS (10), a selected buffer (10db) with message data desired to be sent out;
- (c2) calling a Write operation by referencing the selected buffer 10db to Ports (18);
- (c3) grabbing, by Ports (18), of a selected dialog lock (18L);
- (c4) calling, by Ports (18), of said selected Network Provider (20x) via said Connection Library means which includes elements PIE-CLE 10e to PIE-CLE 20e;
- (c5) allocating, by said Network Provider (20), of a selected buffer (20ib);
- (c6) building, by said Network Provider (20x) of a header for said buffer (20ib);
- (c7) copying, by said Network Provider of said message data in buffer (10db) into said Network Provider's buffer (20ib);
- (c8) calling, by said Network Provider of said external network, in order to send out said message data to said external network;
- (c9) dropping, by Ports (18), of its dialog lock (18L).

5. The method of claim 4 wherein step (c) further includes:
- (c10) indicating, via a Network Data Path (30) interface to said Network Provider, that said message data has been sent.

6. The method of claim 4 which further includes the step of:
- (d) determining that the said message data in buffer (20ib) desired to be sent has not arrived at its destination.

7. The method of claim 6 wherein step (d) further includes the step of:
- (d1) re-sending the message data in buffer (20ib) to said external network for receipt at its destination.

8. A method for enhancing data communication between the Master Control Program (MCP 80) of a computer system with a Distributed System Service/Application Unit (DSS) (10) and Network Provider (20) which interfaces with an external network, and which utilizes software implemented Process Inter-Communication Element Connection Library Element means (18e, 20e) between a Ports Unit (18) of said MCP and said Network Provider (20), said method comprising the steps of:
- (a) initiating, by said DSS (10), the setting-up of a dialog between said MCP 80 and a selected Network Provider (20);
- (b) establishing a selected dialog with a selected Network Provider (20);
- (c) receiving input data, by said Network Provider (20), from said external network;
- (d) retrieving said input data from said Network Provider (20) to said DSS (10) if said prior input data transfer was not completed.

9. The method of claim 8 wherein step (c) includes the steps of:
- (c1) determining, by said Network Provider, which dialog the said input data belongs to;
- (c2) grabbing, by said Network Provider (20), of a dialog lock (18L) in said Ports Unit (18) via reference data in said Network Provider's lock (20L);
- (c3) adjusting said Network Provider's dialog state;
- (c4) calling, by said Network Provider 20, of a Ports Unit (18) via a Process Intercommunication Element-Communication Library Element means (20e, 10e).

10. The method of claim 9 wherein step (c) further includes the steps of:
- (c5) saving, by said Ports Unit (18), of reference data which links to said input data in said Network Provider (20).

11. The method of claim 10 wherein step (c) further includes the steps of:
- (c6) signaling, by said Ports Unit (18), to said DSS (10) that said input data is now available;
- (c7) re-adjusting the dialog state of said Ports Unit (18);
- (c8) dropping, by said Network Provider (20), of said dialog lock (18L) in said Ports Unit (18);
- (c9) accessing of said input data by said DSS (10).

12. The method of claim 8 wherein step (d) includes the steps of:
- (d1) calling a Read operation by said DSS (10) to said Network Provider (20) via a Port File 14 providing a reference to input buffer (10ib) in DSS (10);
- (d2) grabbing, by Ports Unit (18), of a dialog lock (18L) and indicating the dialog is active;
- (d3) using said Process-Intercommunication Element Connection Library Element means (18e, 20e) by said Ports unit (18) to call said Network Provider (20);
- (d4) locating, by said Network Provider (20), the input data called for by said DSS (10);
- (d5) copying, by said Network Provider (20), said input data into said DSS's buffer (10ib).

13. The method of claim 12 wherein step (d) further includes the steps of:

(d6) returning control, by said Network Provider (20) to said Ports Unit (18);

(d7) re-adjusting, by Ports Unit (18) of its dialog state;

(d8) dropping, by Ports Unit (18), of its lock (18L);

(d9) returning control, by said Ports Unit (18), to said DSS (10);

(d10) processing of said received input data, by said DSS (10).

* * * * *